US007058233B2

(12) United States Patent
Silber

(10) Patent No.: US 7,058,233 B2
(45) Date of Patent: Jun. 6, 2006

(54) SYSTEMS AND METHODS FOR CONSTRUCTING AN IMAGE HAVING AN EXTENDED DEPTH OF FIELD

(75) Inventor: Andrew David Silber, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 533 days.

(21) Appl. No.: 09/866,817

(22) Filed: May 30, 2001

(65) Prior Publication Data

US 2002/0181762 A1 Dec. 5, 2002

(51) Int. Cl.
*G06K 9/42* (2006.01)

(52) U.S. Cl. .................. 382/256; 382/154; 382/255; 382/294

(58) Field of Classification Search ............... 382/154, 382/197, 255, 275, 291, 294, 164, 256
See application file for complete search history.

(56) References Cited

U.S. PATENT DOCUMENTS

| 4,141,032 | A | | 2/1979 | Haeusler | |
|---|---|---|---|---|---|
| 4,584,704 | A | | 4/1986 | Ferren | |
| 4,661,986 | A | | 4/1987 | Adelson | |
| 5,325,449 | A | | 6/1994 | Burt et al. | |
| 6,064,767 | A | * | 5/2000 | Muir et al. | 382/190 |
| 6,445,415 | B1 | * | 9/2002 | Olsson | 348/345 |
| 6,678,064 | B1 | * | 1/2004 | Bruce | 358/1.12 |

OTHER PUBLICATIONS

Peter J. Burt et al., "Segmentation and Estimation of Image Region Properties Through Cooperative Hierarchial Computation," *IEEE Transactions on Systems, Man, and Cybernetics*, vol., SMC-11, No. 12, Dec. 1981.
Peter J. Burt et al., The Laplacian Pyramid as a Compact Image Code, *IEEE Transactions on Communications*, vol., Com-31, No. 4, Apr. 1983.

(Continued)

*Primary Examiner*—Andrew W. Johns
*Assistant Examiner*—Patrick Edwards
(74) *Attorney, Agent, or Firm*—Oliff & Berridge, PLC

(57) ABSTRACT

Systems and methods are provided for constructing a composite image having an extended depth of focus from a plurality of spatially congruent source images of lesser depth of focus. The systems and methods are relatively fast, preserve detail, provide robust results on a variety of unpredictable workpiece features and configurations, and tend to suppress or reduce out-of-focus artifacts. The composite image is constructed by edge and/or boundary analysis to identify well-focused edges or boundaries in the source images. Each particular edge or boundary in the composite image is determined based on the source image containing the best-focused instance of each particular edge or boundary. The composite image is constructed outside of the previously constructed portions by surface analysis to identify well-focused surfaces in the source images, Each particular surface portion in the composite image is determined based on the source image with the best-focused instance of each particular surface portion.

14 Claims, 11 Drawing Sheets

OTHER PUBLICATIONS

Peter J. Burt, "Fast Algorithms for Estimating Local Image Properties," *Computer Vision, Graphics, and Image Processing*, 21:368-382, 1983.

Peter J. Burt, "Tree and Pyramid Structures for Coding Hexagonally Sampled Binary Images," *Computer Vision, Graphics, and Image Processing*, 14:271-280, 1980.

Peter J. Burt, "Pyramid-based Extraction of Local Image Features with Applications to Motion and Texture Analysis," *SPIE*, vol. 360, pp. 114-124.

Peter J. Burt, "Fast Filter Transforms for Image Processing," *Computer Graphics and Image Processing*, 16:21-50, 1981.

* cited by examiner

SYSTEMS AND METHODS FOR CONSTRUCTING AN IMAGE HAVING AN EXTENDED DEPTH OF FIELD

BACKGROUND OF THE INVENTION

1. Field of Invention

This invention relates to image-processing systems and methods usable to construct a composite image.

2. Description of Related Art

High resolution machine vision systems, and especially microscopic machine vision systems, often provide a high-resolution, well-focused image of a small portion of a three-dimensional object. However, this is accomplished at the expense of the depth of field, also called the depth of focus, of the surrounding overall image. However, in some machine vision system applications, it is useful both to make high-resolution well-focused microscopic examination and/or record of a small portion of an object and to clearly observe or record the surrounding overall image.

Methods are known for combining, or fusing, separately focused images of a three-dimensional scene or object to accomplish this useful goal. For example, U.S. Pat. No. 4,141,032 to Haeusler discloses focusing through an object at a plurality of levels to produce a plurality of images, filtering each image with a high pass filter, and summing the images passed by the filtering step to produce a composite image containing only the sharp details. Similarly, U.S. Pat. No. 4,584,704 to Ferren discloses obtaining visual in-focus "slices" of an entire image field. When processing the slices as video scan line signals, the signals pass through a high pass filter. This provides signals which may be discriminated to remove all but the spikes, which identify in-focus edges of objects. Signal information between two successive spikes (edges) may also be regarded as part of an in-focus object. The high pass filter may be combined with other filters. The filters may be made adaptive.

In general, such methods that are based on such relatively simple high-pass filtering are relatively fast. However, the composite images obtained are sensitive to the selected filter parameters and/or signal thresholds employed to discriminate between in-focus and out-of-focus features. As such, these methods are not robust for an unpredictable variety of source image objects and/or surface characteristics, and may introduce undesirable information loss and/or admit undesirable high spatial frequency artifacts from out-of-focus image portions.

Methods based on various multi-resolution spatial filtering techniques are also known. For example, U.S. Pat. No. 4,661,986 to Adelson lists numerous papers by Burt describing various aspects of the Burt pyramid method, and discloses a variation of that method. Adelson discloses dividing respective spatial-frequency spectrums of M images into M substantially similar assemblages of N separate specified pixel sample sets that define N spatial frequency bands. A single one of the corresponding samples is selected to derive respective single sets of improved focus pixel samples for each of the N bands. Corresponding pixel samples of the respective single sets are then combined to derive the improved-focus two-dimensional image.

U.S. Pat. No. 5,325,449 to Burt discloses an image fusion method general enough to fuse not only differently-focused images, but qualitatively different images provided by qualitatively different types of sensing/imaging systems. Burt notes that image fusion is successful to the extent that the composite image retains all useful information, does not contain artifacts, and looks natural. Burt notes that previous pyramid techniques, including multi-resolution spatial frequency techniques, have produced noticeable artifacts in composite images. Burt discloses an improved pattern selective method based upon using oriented functions, such as a disclosed gradient function, which improves the retention of edge-like source image patterns in the composite image. This method is enhanced by a local saliency analysis to refine the composite image.

In general, the pyramid methods of Adelson and Burt can be relatively fast, and relatively robust. However, these pyramid methods are primarily based on a single type of mathematical operation which is applied uniformly throughout all images. Thus, the methods remain sensitive, for example, to undesirable high-frequency artifacts which may be produced by unfocused edges in otherwise featureless and/or out-of-focus portions of the source image.

Convolution methods and wavelet-based methods are also known to be usable to derive composite images. Another known "image fusion" method relies on formulating a multi-component energy function and determining the image fusion result which minimizes the energy function. However, all of these methods generally apply a single type of mathematical operation uniformly throughout all images. Depending on the implementation details, such methods are either computationally-intensive, relatively slow, and/or they also share the drawbacks of the previously-described methods.

Further, numerous methods are known that both identify edges in single images and segment single images. However, such methods have failed to consider how to select among multiple source images to create a composite image in a way that anticipates and suppresses the artifacts that are likely to exist in out-of-focus portions of an image.

SUMMARY OF THE INVENTION

Thus, considering that a composite image is successful to the extent that the composite image retains all useful information, does not contain artifacts, and looks natural, and furthermore considering the commercial value and convenience of rapid computation, and furthermore considering the need for robust and reliable results on variety of unpredictable workpiece features and configurations, there is a need for an improved, commercially-appealing solution that balances efficacy against throughput time and provides a high-resolution well-focused image of a small portion of a three-dimensional object while also allowing the user to clearly observe or record the area surrounding that small portion of the three-dimensional object. This problem is particularly significant in automated machine vision systems used for microscopic inspection and measurement. In such systems, there is a need for a composite image construction method that is relatively fast, preserves detail, provides robust results on variety of unpredictable workpiece features and configurations, and that tends to suppress or reduce out-of-focus artifacts.

This invention provides systems and methods that construct a desirable composite image having an extended depth of focus in a relatively short time, and preserves the image detail present in a plurality of source images.

This invention separately provides systems and methods that construct a desirable composite image reliably and robustly, for a variety of unpredictable workpiece features and configurations.

This invention further provides systems and methods that are readily adaptable to construct a desirable composite image even more reliably, robustly, and in an even shorter time, when certain workpiece features are predictable.

This invention separately provides systems and methods that construct a desirable composite image while suppressing likely artifacts arising from out-of-focus features.

In various exemplary embodiments of the systems and methods according to this invention, an object is placed within the overall field of view of a vision system. A plurality of source images of the object are captured, where each captured source image exhibits a different plane of the object in the nominal focus plane of the source image. The source images are either acquired with spatial congruence, or their data representations are mutually adjusted to be spatially congruent. A composite image having an extended depth of focus is constructed by identifying well-focused edges and/or boundaries in the source images. Each particular edge or boundary in the composite image is determined based generally on the source image with the best-focused instance of each particular edge or boundary. The composite image is also constructed by identifying well-focused surfaces in the source images. Each particular surface portion in the composite image is determined based generally on the source image with the best-focused instance of each particular surface portion.

In various exemplary embodiments, the composite image is generated hierarchically, in that the determined edges or boundaries are given priority in the composite image regardless of whether an apparently well-focused surface portion is identified at the same spatial location as an edge or boundary. This tends to suppress artifacts in the composite image in the vicinity of boundaries and edges.

In various other exemplary embodiments of the systems and methods according to this invention, additional buffer zones are established immediately adjacent to determined edges or boundaries. The composite image generation in these buffer zones suppresses artifacts which might otherwise be created by out-of-focus edges "bleeding over into surface regions" in some source images and producing anomalous results during the surface analysis.

In various other exemplary embodiments of the systems and methods according to this invention, the some of the determined well-focused surface portions which initially provide a basis for the composite image are modified, based on consideration of the plane of their corresponding source image, relative to the source image plane(s) of neighboring surface portions.

In contrast to the previously discussed conventional methods, in the various exemplary embodiments of the systems and methods according to this invention, the composite image can be constructed relatively quickly while preserving detail in the composite image. The resulting composite images can be constructed robustly in view of a variety of unpredictable workpiece features and configurations, while out-of-focus artifacts in the resulting composite images tend to be suppressed or reduced.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
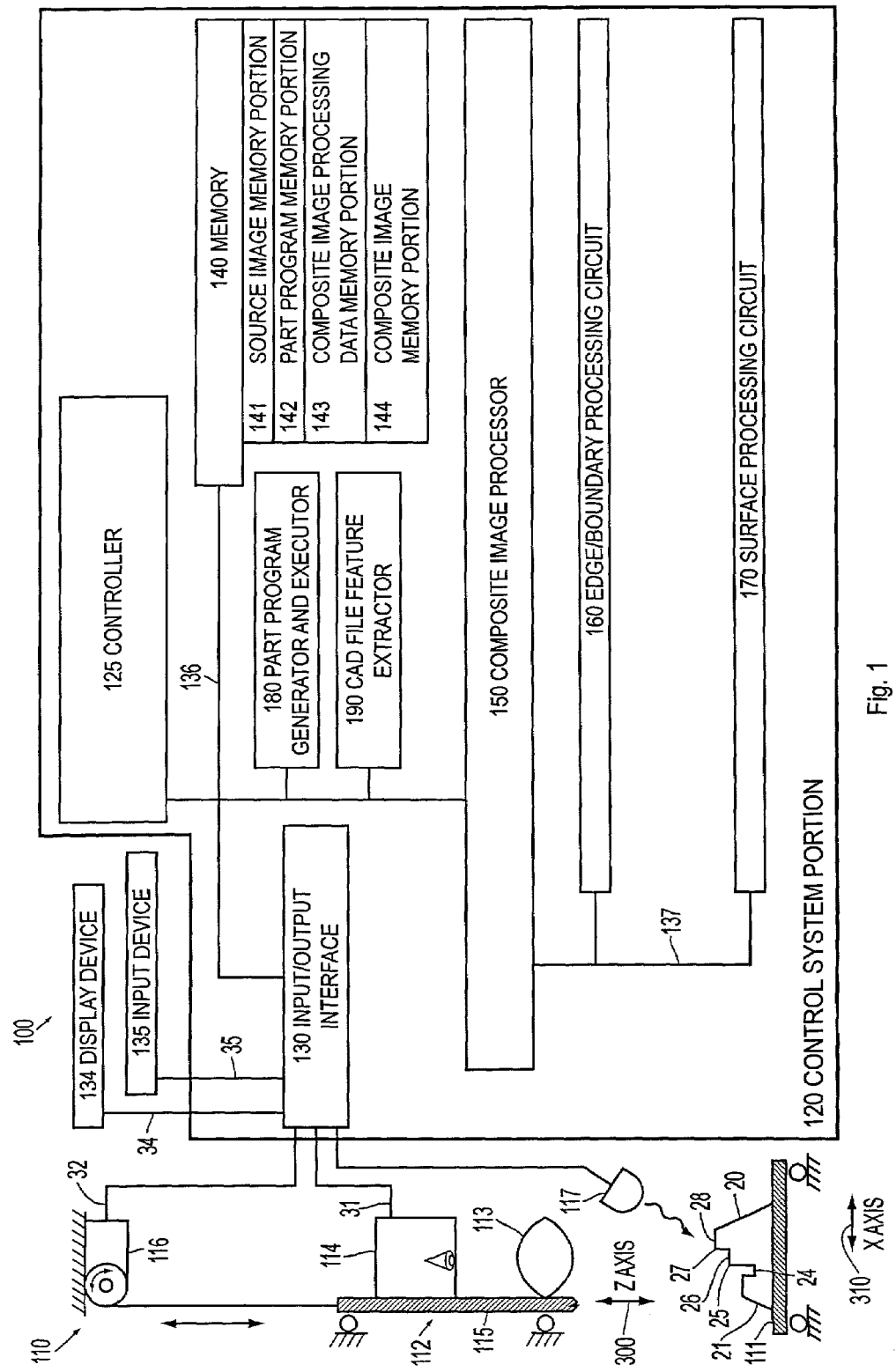
FIG. 1 is a block diagram of one exemplary embodiment of a vision system having a composite image construction system according to this invention.

For simplicity and clarification, the operating principles, and design factors of various exemplary embodiments of the systems and methods according to this invention are explained with reference to one exemplary embodiment of a vision system 100, as shown in FIG. 1. The basic explanation of the operation of the vision system shown in FIG. 1 is applicable for the understanding and design of any vision system that incorporates the systems and/or methods of this invention. Although the systems and methods of this invention are described in conjunction with this specific vision system 100, the systems and methods according to this invention can be used with any other known or later-developed vision system.

FIG. 1 shows a vision system 100. As shown in FIG. 1, the vision system 100 includes a vision system components portion 110 and a control system portion 120. The control system portion 120 includes elements, including a composite image processor 150, which constitute a composite image construction system usable in accordance with this invention. The control system portion 120 further includes elements, including a part program executor and/or generator 170 described below, which constitute a control instruction generation system usable in accordance with this invention.

The vision system components portion 110 includes a stage 111. The stage 111 may be movable relative to the remainder of the vision system components portion 110, in a plane normal to a z-axis 300, for example along an x-axis 310. A part 20 to be imaged using the vision system 100 is placed on the stage 111. The part 20 shown in FIG. 1 includes a number of relatively planar surface regions 24, 26 and 28, a number of edges 25 and 27 and at least one inclined surface region 21. A light source 117 can be used to illuminate the part 20. The light source 117 may be a simple surface light, a ring light or a programmable ring light, and may include other lights sources, such as a stage light and/or a coaxial light.

The light from the light source 117, after illuminating the part 20, passes through a lens system 113, and is gathered by a camera system 114 to generate an image of the part 20. The lens system 113 and the camera system 114 are fastened to a housing/frame 115 to form an imaging assembly 112. The imaging assembly 112 is movable along the z-axis 300 by an actuator 116. By moving the imaging assembly 112 along the z-axis 300, the focal plane of the lens system 113 is moved along the z-axis 300 relative to the part 20. Thus, it is possible to move the imaging assembly 112 over a chosen range and capture a set of source images of the part 20, where different portions of the part 20 are in focus in different ones of the set of source images. Furthermore, the set of source images which are captured in this manner will, in general, be substantially spatially congruent.

Each image acquired by the camera system 114 is output on a signal line 31 to the control system portion 120. As shown in FIG. 1, the control system portion 120 includes a controller 125, an input/output interface 130, a memory 140, the part program executor and/or generator 180, a CAD file feature extractor 190, and the composite image processor 150, each interconnected either by a data/control bus 136 or by direct connections between the various elements. The signal line 31 to and from the camera system 114, the signal line 32 to and from the actuator 116, and the signal line 33 to and from the light source 117 are connected to the input/output interface 130. In various exemplary embodiments, the input/output interface 130 may include one or more of an imaging control interface portion (not shown) usable to interact with the camera system 114, a motion control interface portion (not shown) usable to interact with the actuator 116, and a lighting control interface portion (not shown) usable to interact with the light source 117.

A display device 134 and one or more input devices 135 also can be connected to the input/output interface 130 over a signal line 34 and one or more signal lines 35, respectively. The display 134 and the one or more input devices 135 can be used to view, create and modify part programs, to input CAD file information regarding the part 20, to view the source images captured by the camera system 114, to view composite images, and/or to directly operate the control system portion 120 and/or the vision system components 110. However, it should be appreciated that, in a fully automated system having a predefined part program, the display 134 and/or the one or more input devices 135, and the corresponding signal lines 34 and/or 35 may be omitted.

The memory 140 records and holds data as necessary for the operation of the vision system 100. In various exemplary embodiments, the memory 140 includes one or more of a source image memory portion 141, a part program memory portion 142, a composite image processing memory portion 143, and/or a composite image memory portion 144. The source image memory portion 141 stores source images captured using the camera system 114 when operating the vision system 100. The part program memory portion 142 stores one or more part programs used to control the operation of the vision system 100 for particular types of parts. The composite image processing memory portion 143 contains data recorded and/or created as needed during the operations of the composite image processor 150, as described in greater detail below. The composite image memory portion 144 contains composite image data representations and/or composite images which are output by the composite image processor 150.

The exemplary composite image processor 150 as included in the control system portion 120 shown in FIG. 1, is one exemplary embodiment of a composite image processor usable according to the systems and methods of this invention. The exemplary composite image processor 150 of FIG. 1 includes an edge/boundary processing circuit or software routine 160, and a surface processing circuit or software routine 170, each interconnected either by a data/control bus 137, by one or more application programming interfaces or by direct connections between the various circuits or software routines. The data/control bus 137 and the data/control bus 136 may be the identical data/control bus in various exemplary embodiments of the control system portion 120.

The exemplary edge/boundary processing circuit or software routine 160 shown in FIG. 1 processes source image data from a plurality of source images and determines a set of edge or boundary pixels in the composite image based on the analyzed source images. That is, the edge/boundary processing circuit or software routine 160 is operable to perform a type of analysis of the set of source images usable to determine a first set of pixels of the composite image corresponding to edges and/or boundaries in the composite image. The exemplary surface processing circuit or software routine 170 shown in FIG. 1 processes source image data from a plurality of source images and determines a set of surface pixels in the composite image based on the analyzed source images. Similarly, the surface processing circuit or software routine 170 is operable to perform a type analysis of the set of source images usable to determine a second set of pixels of the composite image corresponding to surface regions in the composite image. The various elements and operation of the composite image processor 150 are described in further detail elsewhere herein.

It should be appreciated that the foregoing description of the vision system 100 usable according to this invention generally describes a system suitable for automatic program operation. However, the vision system 100 used with this invention may also operate substantially the same when the commands, including composite image construction commands, are issued manually through the one or more input devices 135 during manual or stepwise operation of the vision system 100. Furthermore, although the vision system 100 is capable of adapting to various components and operating parameters, the following discussion generally assumes that the configuration of the vision system components portion 110 and the workpiece under inspection are already known and/or are predictable. In addition, any necessary operating conditions which are not specifically discussed are assumed to have been met according to well-known procedures for the operation of machine vision systems.

When a machine vision system operator wishes to construct a composite image of a specific portion of an object, such as a portion of the part 20 mounted on the stage 111, the user operates the vision system 100 to position that portion of the object within the field of view of the vision system 100. Various image acquisition parameters, for example, the lighting settings, and the positioning and/or focus of the imaging assembly 112, are chosen to provide an acceptable set of source images. These parameters, positioning and/or focus of the imaging assembly 112 are obtainable either by operator trial and error or with the assistance of a variety of automated "tools" available on a variety of commercially-available machine vision systems, such as the Quick Vision series of vision inspection machines available from Mitutoyo America Corporation (MAC), located in Aurora, Ill.

By moving the imaging assembly 112 along the z-axis 300, the focal plane of the lens system 113 is moved along the z-axis 300 relative to the part 20. Thus, it is possible to move the imaging assembly 112 over a chosen range and capture a set of source images of the part 20, where, in general, each important feature of the desired portion of the part 20 will be in focus in at least one of the different source images. The chosen range may be divided into a plurality of equidistant movements along the z-axis in order to acquire the plurality of source images. Alternatively, z-axis positions that allow important features of the part 20, such as the relatively planar surface regions 24, 26 and 28, for example, to be specifically focused on or a combination of these approaches, may be chosen. The plurality of source images may be stored in the source image memory portion 141.

For the exemplary configuration of the vision system 100 shown in FIG. 1, the set of source images which are captured in this manner will be substantially spatially congruent. That is, a particular spatial location in one source image will correspond to the same portion of the object at the same spatial location in any of the other source images. For purposes of composite image processing, if it is not assured that the source images are spatially congruent, the plurality of source images may be analyzed by well-known techniques, such as, for example, by image correlation or other pattern-matching techniques so that the spatial locations of the plurality of source images may be adjusted to provide for spatial congruence. The spatial congruence/feature congruence processing circuit or software routine 152 of the composite image processor 150 can be used to determine if the images are spatially congruent and/or to implement one or more of these techniques for adjusting the spatial locations to obtain spatial congruence.

If the operator desires to obtain a composite image which corresponds to only a portion of a full source image then, by using the display device 134 and/or an input device 135 of the vision system 100, the operator may choose and/or define the desired portion of the object 20, for example, by using a so called "box tool" on the display device 134. In this case, any subsequent composite image processing operations may be restricted to the corresponding spatial locations.

Any or all of the foregoing operator actions or instructions may be recorded by the part program generator and executor 170, and the results stored in the part program memory portion 142 for later recall and automatic execution by the part program generator and executor 170, for example to inspect and/or make a record of a different specimen of the part 20. The foregoing describes one exemplary way of providing a plurality of source images usable according to the systems and methods of this invention. However, it should be appreciated that the systems and methods of this invention are useable with any similar plurality of source images, regardless of the details of the imaging system, the portion of the electromagnetic spectrum used to acquire the plurality of source images, and/or the operations used to acquire and/or prepare the plurality of source images.

Figure 2:
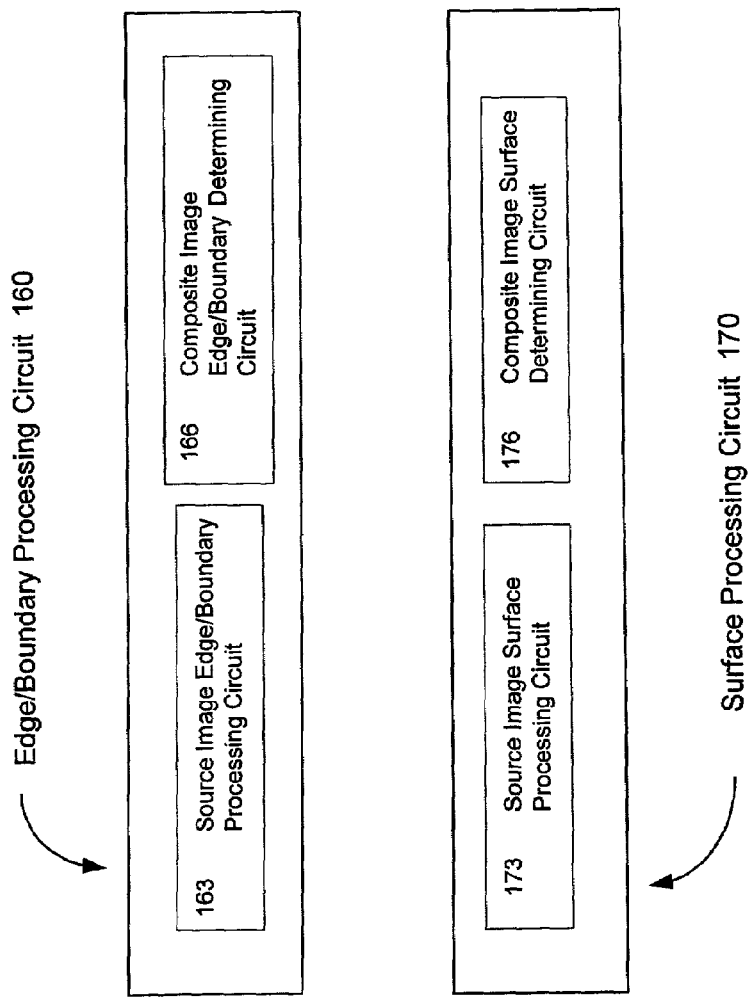
FIG. 2 is a block diagram outlining in greater detail exemplary embodiments of the composite image processor of FIG. 1 according to this invention.

FIG. 2 is a block diagram outlining exemplary embodiments of the edge/boundary processing circuit or software routine 160 and the surface processing circuit or software routine 170 of the composite image processor 150 of FIG. 1 according to this invention. As shown in FIG. 2, the edge/boundary processing circuit or software routine 160 includes a source image edge/boundary processing circuit or software routine 163 and a composite image edge/boundary determining circuit or software routine 166. The surface processing circuit or software routine 170 includes a source image surface processing circuit or software routine 173 and a composite image surface determining circuit or software routine 176.

It should be appreciated that the particular structures shown in FIG. 2 for the edge/boundary processing circuit or software routine 160 and the surface processing circuit or software routine 170 are independent of each other. Thus, while specific exemplary structures for both of the edge/boundary processing circuit or software routine 160 and the surface processing circuit or software routine 170 are shown together in FIG. 2, each of these specific structures of the edge/boundary processing circuit or software routine 160 and the surface processing circuit or software routine 170 can be implemented separately of the other, and combined with other exemplary structures of the other of the edge/boundary processing circuit or software routine 160 and the surface processing circuit or software routine 170. Thus, the specific combination of structures of the edge/boundary processing circuit or software routine 160 and the surface processing circuit or software routine 170 shown in FIG. 2 should be understood as exemplary only, and not limiting or essential.

The source image edge/boundary processing circuit or software routine 163 is usable to process and/or characterize the source image data from a plurality of source images. The composite image edge/boundary determining circuit or software routine 166 determines a set of edge or boundary pixels in the composite image based on the results of the edge/boundary processing circuit or software routine 163. In various exemplary embodiments, the edge/boundary processing circuit or software routine 163 may include an analysis portion (not shown) usable to analyze or characterize spatial locations in the source images and provide results indicative of potential edge or boundary pixels in the source images.

In various other exemplary embodiments, the source image edge/boundary processing circuit or software routine 163 may further include a validating portion (not shown) usable to screen out some of the results indicative of potential edge or boundary pixels in the source images. If implemented, the validating portion leaves only the results actually indicating acceptable edge or boundary pixels in any of the source images. Further, in various exemplary embodiments, the composite image edge/boundary determining circuit or software routine 166 may include a selector portion (not shown) usable to select or qualify the best edge or boundary pixels for the composite image from among the results provided by the edge/boundary processing circuit or software routine 163. In various other exemplary embodiments, the composite image edge/boundary determining circuit or software routine 166 may further include a refinement portion (not shown) usable to refine the results from the selector portion, for example, to reject image artifacts not otherwise rejected by the systems and methods according to this invention.

The source image surface processing circuit or software routine 173 is usable to process and/or characterize source image data from a plurality of source images. The composite image surface determining circuit or software routine 176 determines a set of surface pixels in the composite image based on the results of the surface processing circuit or software routine 173. In various exemplary embodiments, the surface processing circuit or software routine 173 may include an analysis portion (not shown) usable to analyze or characterize spatial locations in the source images and provide results indicative of potential surface pixels in the source images.

Further, in various exemplary embodiments, the composite image surface determining circuit or software routine 176 may include a selector portion (not shown) usable to select or qualify the best edge or boundary pixels for the composite image from among the results provided by the surface processing circuit or software routine 173. In various other exemplary embodiments, the composite image surface determining circuit or software routine 176 may further include a refinement portion (not shown) usable to refine the results from the selector portion, for example, to reject image artifacts not otherwise rejected by the systems and methods according to this invention.

In various other exemplary embodiments, the composite image processor 150 may further include auxiliary circuits or software routines (not shown) including one or more of a spatial congruence and/or feature congruence processing circuit or software routine, a composite image refinement processing circuit or software routine, and a composite image storage and/or output processing circuit or software routine which are each interconnected either by a data/control bus, by one or more application programming interfaces or by direct connections between the various circuits or software routines. The operations performed by these auxiliary circuits or software routines are described in greater detail further below.

Figure 3:
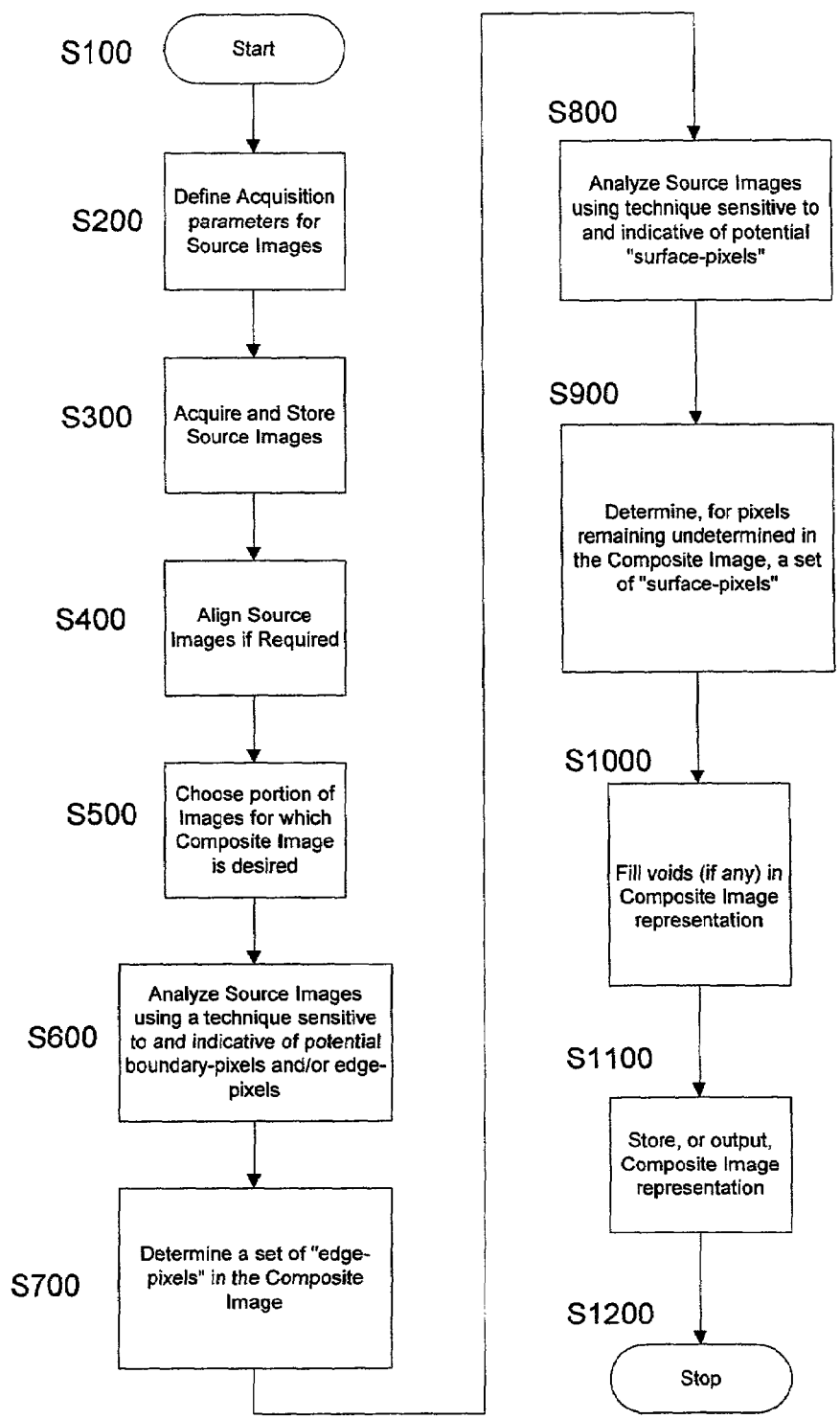
FIG. 3 is a flowchart outlining one exemplary embodiment of a method for generating a composite image according to this invention.

FIG. 3 is a flowchart outlining one exemplary embodiment of a method for generating a composite image according to this invention. Beginning in step S100, operation continues to step S200, where vision system operating parameters usable to acquire a plurality of source images of a desired portion of an object are defined. The vision system operating parameters can be defined manually, in a semi-automated fashion, or fully automatically. The general characteristics of the plurality of source images to be obtained through the effects of these parameters have been previously described. Next, in step S300, the plurality of source images are acquired and their representative data is stored. Then, in step S400, if it is not assured that the acquired source images are aligned, that is, spatially congruent, as outlined above, the plurality of source images are analyzed by any known or later-developed technique, such as, for example by image correlation or any other pattern-matching technique. The representative data of the plurality of source images is adjusted based on this analysis to place the plurality of images into spatial congruence. Operation then continues to step S500.

In step S500, if a composite image is desired for a portion of an object which corresponds to only a portion of the full source image frame, then the spatial location range for which a composite image is desired is defined. The bounds of this portion of the full source image frame can be defined manually, in a semi-automated fashion, or fully automatically. The subsequent composite image processing operations may be restricted to correspond to the defined bounds, or spatial location range, of the portion to reduce processing time. Then, in step S600, each of the plurality of source images is characterized and/or analyzed using a technique that is sensitive to and indicative of potential boundary pixels and/or edge pixels in each analyzed source image. A wide variety of techniques usable in any known or later-developed edge-detection method are usable in various exemplary embodiments of the systems and methods according to this invention, as will be described further below. In various other embodiments, any known or later-developed edge detector, such as the Canny edge detector (the structure and operation of which is well-known to those of ordinary skill in the art) and the like, may be used in its entirety in step S600 to provide results usable in the systems and methods according to this invention. Next, in step S700, the results of the edge and/or boundary analysis technique are evaluated to determine a set of "edge" pixels in the composite image, as will be described further below. Operation then continues to step S800.

In step S800, each of the plurality of source images is characterized and/or analyzed using a technique that is sensitive to and indicative of potential surface pixels in each analyzed source image. In the broadest sense under various exemplary embodiments of the systems and methods according to this invention, surface pixels includes any pixels that are not determined to be edge and/or boundary pixels. A wide variety of techniques usable in any known or later-developed surface-focus detection method, region characterization method, and/or image segmentation method, are usable in various exemplary embodiments of the systems and methods according to this invention, as will be described further below. Next, in step S900, for pixels remaining undetermined in the composite image, that is, for those pixels of the composite image which have not been previously determined, the results of the surface pixel analysis technique are used to determine a set of "surface" pixels in the composite image. In various exemplary embodiments, region-filling or region-growing type operations are used to determine the composite image surface pixels according to the systems and methods of this invention, as described in detail further below. Operation then continues to step S1000.

In step S1000, any voids in the composite image representation resulting from the previous steps are filled. A variety of techniques are known for filling such voids in conventional images. Any known or later-developed void filling technique may be used in various exemplary embodiments of the systems and methods according to this invention. However, because there are a plurality of source images which may potentially be used as the basis for the pixels values to be used to fill the voids in the composite image, in various exemplary embodiments, the techniques used to fill the voids are supplemented with additional operations for selecting which source images will provide that basis, as will be described further below. Operation then continues with step S1100.

It should be appreciated that step S1000 is optional, and thus may be omitted, depending on the details of the edge and/or boundary and/or the surface analyses used in various embodiments of the systems and methods according to this invention. If the edge and/or boundary and/or the surface analyses inherently determine all pixels of the composite image, then inspecting the composite image representation for voids and filling the voids is not strictly necessary. In this case, step S1000 is omitted, and operation simply skips from step S900 to step S1100. However, if the previous steps do not determine all pixels of the composite image, then it is preferred to fill the voids in the composite image representation using step S1000.

In step S1100, the composite image representation is then stored to a memory device and/or output to a display device or recording device in any of a variety of suitable forms. In various exemplary embodiments, this storing and/or output step may include operations for transforming the composite image representation resulting from the previous steps into a subsequent electronic or physical representation of the composite image which is more convenient, desirable and/or useful for a particular purpose. For example, depending on the details of the previous steps, in various embodiments of the systems and methods according to this invention, separately stored records of the edge-pixels and the surface-pixels of the composite image are assembled or merged into a single stored representation of the composite image.

As a further example, in various embodiments of the systems and methods according to this invention, the composite image representation may be in the form of a "map" of the spatial locations in the composite image, where the map contains function values or indexes, in contrast to actual pixel intensity values. Furthermore, the spatial resolution in all or part of the map may be at the spatial resolution of the pixels in the source images, or it may at a coarser spatial resolution in the form of "meta-pixels". Thus, in such embodiments, before the corresponding composite image can be meaningfully displayed as a conventional image, conventional gray-scale or color image data must be assembled by transforming such a "map" representation to the desired resolution and data format. In any case, in step S1100, a desired representation of the composite image which is convenient, desirable and/or useful for a particular purpose is stored to a memory device and/or output to a display device or recording device. Operation then continues to step S1200, where the operation ends.

It should be appreciated that steps S100–S500 are just one exemplary embodiment of the method for providing a plurality of source images usable according to the systems and methods of this invention. Thus, it should be appreciated that the systems and methods of this invention generally, and steps S600–S1200 in particular, are useable with any similar plurality of source images, regardless of the details of the underlying imaging system, the portion of the electromagnetic spectrum used to acquire the plurality of source images, or the particular operations used to acquire and/or prepare a similar plurality of source images.

With regard to the terms "boundaries" and "edges" as used herein, the terms "boundaries" and "edges" are generally used interchangeably with respect to the scope and operations of the systems and methods of this invention. However, when the context dictates, the term "edge" may further imply the edge at a discontinuity between different surface planes on an object and/or the image of that object. Similarly, the term "boundary" may further imply the boundary at a discontinuity between two colors, or other relatively homogeneous surface properties, on a relatively planar surface of an object, and/or the image of that object.

The terms "boundary pixels" and "edge pixels" are used interchangeably with respect to the scope and operations of the systems and methods of this invention. Both terms are intended to refer to pixels in the vicinity of local intensity changes in an image. These local intensity changes can be either grayscale intensity or a color intensity, for example. These local intensity changes are generally detectable by any conventional or enhanced, or any later-developed, edge-detection operation. Similarly, the terms "boundary properties" and "edge properties" are used interchangeably with respect to the scope and operations of the systems and methods of this invention. Both terms are intended to refer to any property, whether numerically characterizable or otherwise, that is usable, either alone or in combination, by any conventional or enhanced, or any later-developed, edge-detection operation.

Some operations usable to characterize boundary properties and to detect edges include, but are not limited to, high-frequency spatial filtering, gradient analyses, directional gradient analyses, gradient derivative analyses, aspect ratio analysis, extent and/or connectedness analysis of candidate edges, and the like. Gradient analysis includes, but is not limited to, any one or more of gray-scale intensity, color intensity, texture measures, and the like. Aspect ratio analysis includes, but is not limited to, evaluating the length vs. width of candidate edges.

These and other operations which are sensitive to and indicative of boundary and/or edge properties are known to one skilled in the art of image processing, and are included in one or more of a wide variety of known edge-detection techniques. The chapter regarding edge-detection in the Machine Vision, by Ramesh Jain, et al., McGraw Hill, 1995 discusses related teachings and references. It should also be appreciated that nearly all of the operations discussed above which are sensitive to and indicative of boundary properties and usable to identify edges in an image are furthermore sensitive to and indicative of the degree to which an edge is focused in an image, since out-of-focus edges are blurred and therefore exhibit a different spatial distribution of intensities than when focused, and, when extremely out-of-focus, are not visible at all.

It should be further appreciated that, in various exemplary embodiments, it is desirable to use an edge-detection operation which operates over all of the analyzed source images to determine the set of composite image edge pixels. This set of composite image edge pixels will include an edge pixel at any spatial location where analysis of the plurality of spatially congruent source images indicates that there is a valid edge pixel in at least one of the spatially congruent source images. Accordingly, it should be appreciated that, in various embodiments of the systems and methods according to this invention, the operations previously described corresponding to steps S600 and S700 combine to implement an edge-detection operation which operates over the plurality of source images to perform a type of analysis of the source images usable to determine a first set of pixels of the composite image corresponding to edges and/or boundaries in the composite image.

Thus, the operations previously described as corresponding to steps S600 and S700 might alternatively be characterized as a single, more complex, multi-image composite edge-detection operation corresponding to a single step. Accordingly, in various embodiments, any known or later-developed multi-image composite edge detector, such as the multi-image fusion edge detector disclosed in the previously discussed '449 Patent, may be used to provide results usable in the systems and methods according to this invention. Various other exemplary operations related to determining edge pixels in the composite image are discussed in detail further below.

With regard to the term "surface pixels" as used herein, as previously mentioned, in the broadest sense according to this invention, "surface pixels" include any pixels that are not determined to be boundary pixels and/or edge-pixels. In addition, in many practical cases according to the systems and methods of this invention, "surface pixels" will be pixels that constitute an image of a relatively well-focused, homogenous, and relatively planar local region on an object. The term "surface property", as used herein, generally refers to any property, whether numerically-characterizable or otherwise, that is usable, either alone or in combination, by any known or later-developed region characterization operation or technique, such as, for example, surface and texture classification methods.

Stated another way, surface properties are the properties associated with the statistical properties and spatial distribution of gray levels and/or color levels in a particular local neighborhood. Some operations usable to characterize surface-properties include but are not limited to, for example, variance analysis, average intensity, other statistical texture and/or contrast measures, fractal dimension, texture directionality measures, and the like. Variance analysis and average intensity can each be applied to, for example, gray level values or color level values.

These and other operations which are sensitive to and indicative of surface properties are known to one skilled in the art of image processing, and are included in one or more of a wide variety of known surface-focus detection (autofocus) methods, region/texture characterization methods, and/or image segmentation methods. The chapters regarding texture and regions in the Machine Vision, by Ramesh Jain, et al., McGraw Hill, 1995 discuss related teachings and references. It should be appreciated that nearly all of the operations discussed above which are sensitive to and indicative of surface properties for the purpose of classifying surface regions, and especially those useful for the purpose of classifying textures, are furthermore sensitive to and indicative of the degree to which a surface is focused in an image, since out-of-focus surface textures are blurred and therefore exhibit a different statistical and spatial distribution of intensities than when focused, and when extremely out-of-focus are show only a uniform intensity (i.e., perfectly smooth texture).

With regard to the determination of surface pixels in the composite image, it should be appreciated that, in various exemplary embodiments, it is desirable to use a surface-pixel determining operation which operates over all of the analyzed source images to determine a set of composite surface pixels including any spatial location which is not otherwise determined to be the location of a boundary pixel and/or an edge pixel. Accordingly, it should be appreciated that, in various embodiments of the systems and methods according to this invention, the operations previously described as corresponding to steps S800 and S900 combine to implement a surface-detection operation which operates over the plurality of source images to perform a type of analysis of the source images usable to determine a set of pixels of the composite image corresponding to surface regions in the composite image. Thus, the operations previously described as corresponding to steps S800 and S900 might alternatively be characterized as a single, more complex, multi-image composite surface-detection operation corresponding to a single step. Various exemplary operations related to determining surface pixels in the composite image are discussed in detail further below.

Figure 4:
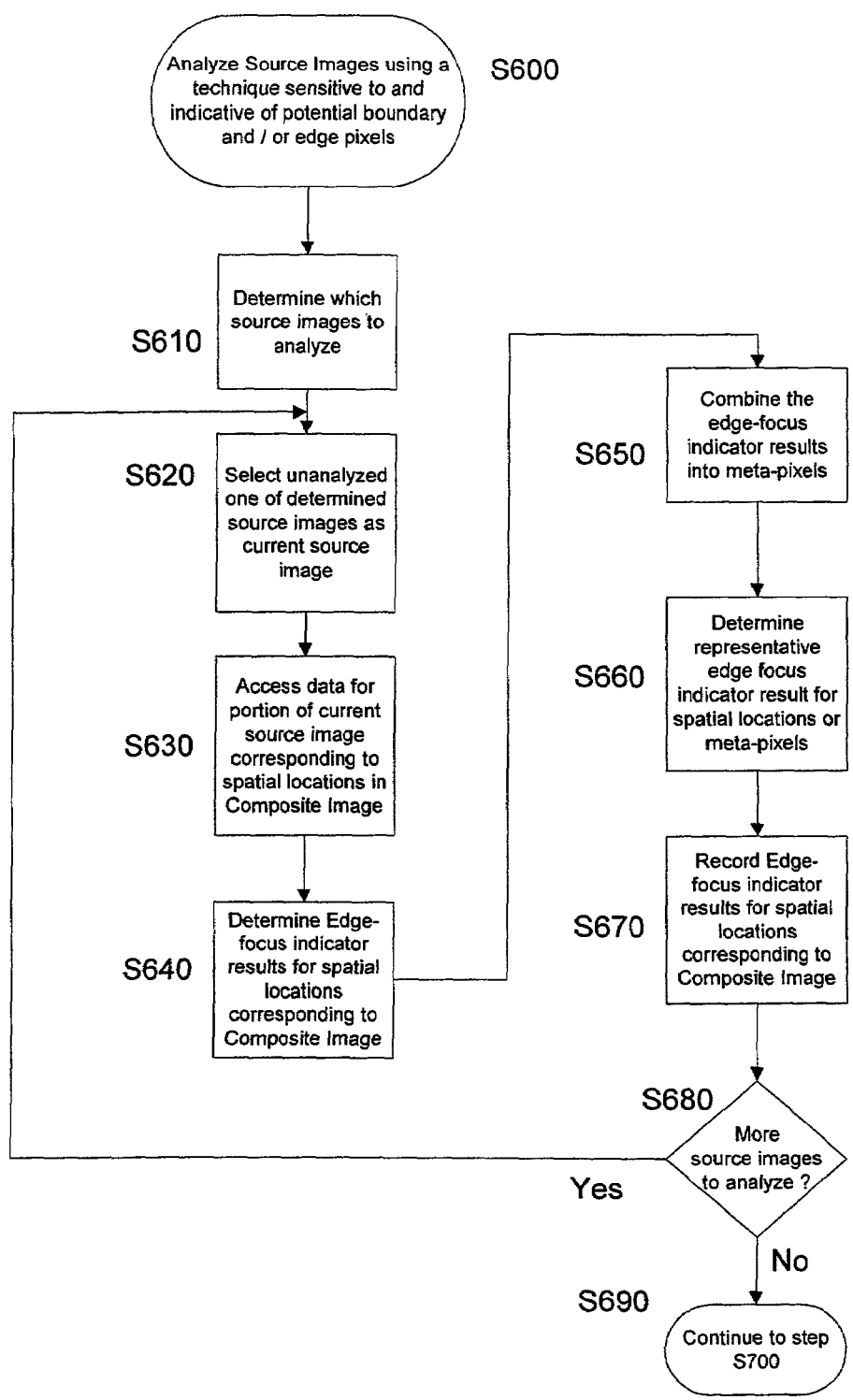
FIG. 4 is a flowchart outlining in greater detail one exemplary embodiment of the step of analyzing the source images using a technique sensitive to and indicative of potential boundary pixels and/or edge pixels of FIG. 3 according to this invention.

FIG. 4 is a flowchart outlining in greater detail one exemplary embodiment of analyzing the source images using a technique sensitive to and indicative of potential boundary pixels and/or edge pixels of step S600 of FIG. 3, according to this invention. Beginning in step S600, operation continues to step S610, where the source images to be analyzed are determined or defined manually, in a semi-automated fashion, or fully automatically. For example, in the general case, one or more sets of source images may have been previously acquired and stored. In such a case, step S600 may start after a long interruption of operations. Thus, it is necessary to select and recall a particular set of source images. In another case, a set of source images may include images which include no focused features in the desired composite image region. It may be desirable to eliminate such source images from analysis, to reduce processing time.

Next, in step S620, one of the source images determined in step S610 which has not been previously selected for analysis is selected as the current source image to be analyzed. Then, in step S630, the data is accessed for the current source image to be analyzed. More particularly, the data is accessed for the spatial locations within the current source image which correspond to the spatial locations to be included in the desired composite image. Operation then continues to step S640.

In step S640, the accessed source image data is analyzed to provide edge-focus indicator results and to provide a local result at a desired spatial resolution. In various exemplary embodiments, in step S640, the accessed source image data is analyzed using a mathematical or algorithmic technique which is sensitive to and indicative of local intensity changes in the image. These local intensity change can be either changes in the grayscale intensity values or changes in the color intensity values, for example.

In various exemplary embodiments, the data for the current source image is first normalized with respect to white level. Then, two gradient operators which are the derivatives of a 2-dimensional Gaussian in the directions of the rows and columns of the image data, respectively, are defined. In one exemplary embodiment the 2-dimensional Gaussian is set at a size of 11 by 11 pixels, and an effective width of 9 pixels. These gradient operators are systematically applied at each possible pixel location throughout the current source image, according to well-known convolution methods. The magnitude of the sum of the squares of the respective gradient operator results is taken as the local gradient result, for each pixel throughout the current source image. In this case, the local gradient results are the edge-focus indicator results. Such techniques are known to one skilled in the art of image processing. *Machine Vision*, by Ramesh Jain, et al., McGraw Hill, 1995 discusses related teachings.

Then, in step S650, the edge-focus indicator results are combined into meta-pixels. Next, in step S660, an edge-focus indicator result representative of each meta-pixel is determined. The edge-focus indicated result can be determined, for example, by averaging all of the edge-focus indicator results encompassed by the meta-pixel. Typically, if meta-pixels are used with respect to one source image, then meta-pixels should be used with respect to each source image. Operation then continues to step S670.

It should be appreciated that steps S650 and S660 are optional, depending, for example, on the magnification and resolution of the source images relative to the features on the imaged object, and/or whether it is desirable to minimize the composite image processing time. If the composite image processing time is not important in a particular application, then operation simply skips from step S640 directly to step S670.

In step S670, the determined edge-focus indicator results are recorded or stored for subsequent use. It should be appreciated that, regardless of the spatial resolution, that is, whether at a pixel a pixel resolution or at a meta-pixel resolution, the edge-focus indicator results for the current source image encompass, and are generally spatially congruent with, the spatial locations included in the desired composite image. Then, in step S680, a determination is made whether all the determined source images have been analyzed. If there are more source images to be analyzed then operation returns to step S620. Otherwise, operations corresponding to step S600 of FIG. 3 are complete. In this case, operation continues to step S690, where the operation continues to step S700.

Figure 5:
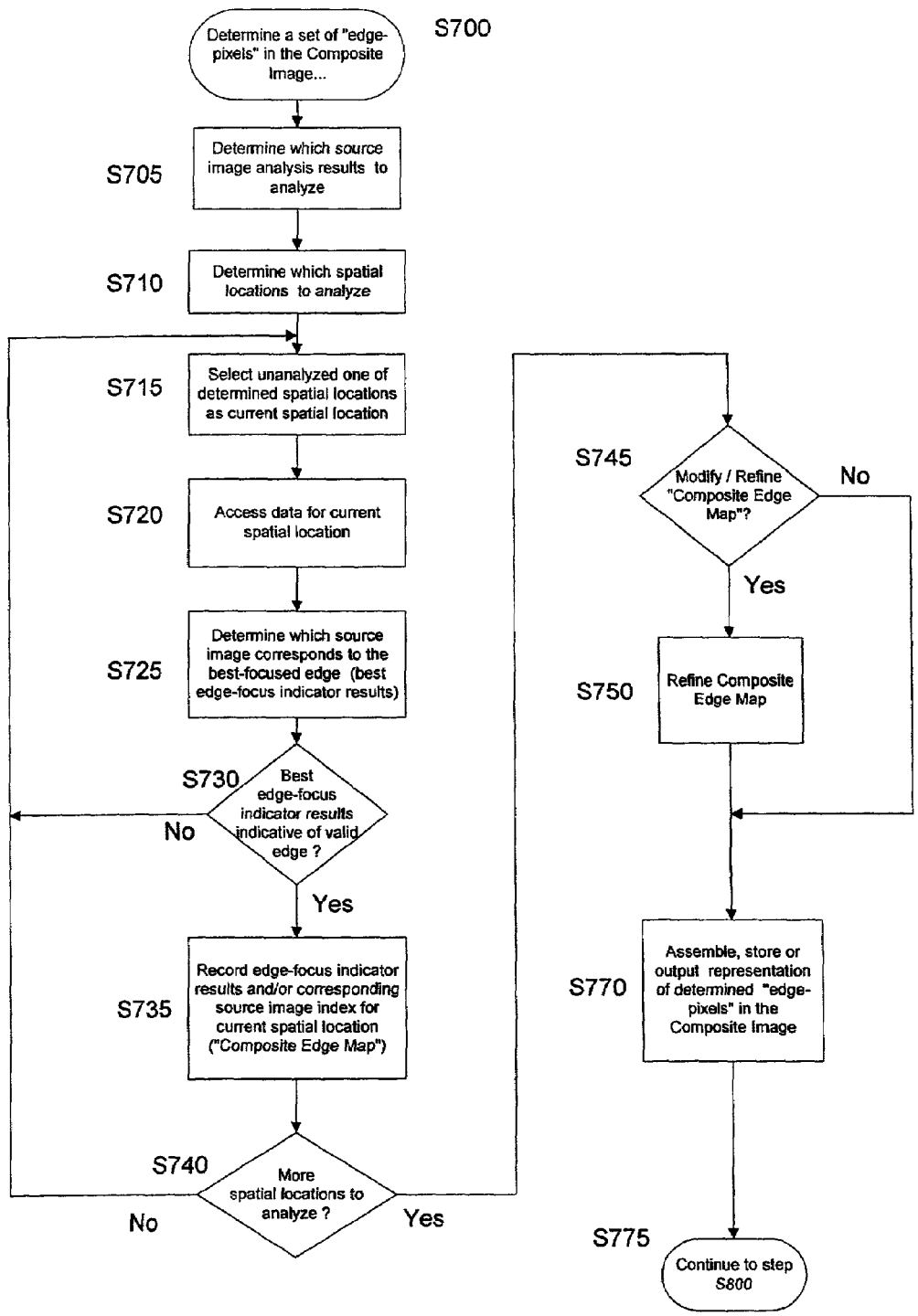
FIG. 5 is a flowchart outlining in greater detail one exemplary embodiment of the step of determining or selecting a set of edge pixels of FIG. 3 according to this invention.

FIG. 5 is a flowchart outlining in greater detail one exemplary embodiment of determining or selecting a set of edge pixels of step 700 of FIG. 3 according to this invention. As indicated above, in various exemplary embodiments, the determination or selection of the edge pixels is based on the results from an analysis technique which is sensitive to and indicative of potential boundary pixels and/or edge pixels. Beginning in step S700, operation continues to step S705, where the source image analysis results to be analyzed are determined. Then, in step S710, the spatial locations to be analyzed in the determined source image analysis results are identified. Operation then continues to step S715.

Depending on the particular structure of the composite image processing according to this invention, it may be necessary to establish or reestablish which source image analysis results are to be further analyzed. These source image analysis results to be further analyzed may be determined or defined manually, in a semi-automated fashion, or fully automatically. In various exemplary embodiments, the source image analysis results determined or defined in a previous step, such as step S600 of FIG. 3, represent the source image analysis results to be further analyzed.

Similarly, depending on the particular structure of the composite image processing according to this invention, it may be necessary to establish or reestablish which spatial locations in the source image analysis results are to be further analyzed. In general, these spatial locations correspond to the spatial locations included in the desired composite image. These may be determined or defined manually, in a semi-automated fashion, or fully automatically. In various exemplary embodiments, the source image analysis results determined or defined in a previous step, such as step S600 of FIG. 3, represent the spatial locations to be further analyzed.

In step S715, one of the spatial locations identified in step S710 which has not been previously selected for analysis according to this step S715 is selected as the current spatial location to be analyzed. Next, in step S720, the source image analysis results data corresponding to each source image identified in step S705, are accessed for the current spatial location to be analyzed. Stated another way, all of the spatially congruent source image analysis results are accessed for all source images, for a current spatial location.

Then, in step S725, the accessed data is analyzed to determine or select the best source image analysis result, to maximize the composite image focus results. For example, if the source image analysis results are numerical edge-focus indicator results, a most appropriate one of the plurality of numerical edge-focus indicator results is selected. In various exemplary embodiments, the most appropriate numerical edge-focus indicator result is the maximum result. Operation then continues to step S730.

In step S730, a determination is made whether the selected source image analysis result is indicative of a valid edge. For example, if the source image analysis result is a numerical edge-focus indicator result, this result is compared to a numerical threshold value, where only values exceeding the threshold value are taken to be indicative of a valid and adequately-focused edge for purposes of constructing the composite image. If the source image analysis result is not indicative of a valid edge, then operation returns to step S715. Otherwise, operation continues to step S735.

In an alternative embodiment of the operations described relative to steps S725 and S730, processing time is minimized by selecting the first processed source image analysis result which is indicative of a valid and adequately-focused edge for purposes of constructing the composite image. For example, if the source image analysis results are the previously-discussed numerical edge-focus indicator results, the plurality of numerical edge-focus indicator results is systematically compared to a numerical threshold value indicative of a valid and adequately-focused edge. Then, the first result to exceed the threshold is selected as a source image analysis result for constructing the composite image. In this case, following the selection of a result exceeding the threshold, operation continues to step S735. Otherwise, if no source image analysis result is indicative of a valid edge, then operation returns to step S715.

In step S735, the determined source image analysis result indicative of a valid edge, and/or an indication of the corresponding source image, such as an index number, is recorded or stored relative to the current spatial location. It should be appreciated that it is convenient to refer to the data elements and their respective associations recorded in step S735 as elements of a "composite edge map". However, it should be understood that whenever the term "map" is used herein, the term is being used only as a convenient reference for the underlying data elements and their respective associations, regardless of whether these recorded data elements are ever actually structured into a map in any conventional sense. It should be further understood that the scope of the systems and methods of this invention is in no way restricted to any particular representation of the basic underlying data and data associations disclosed herein.

Then, in step S740, a determination is made whether all of the previously determined spatial locations to be analyzed have been analyzed. If there are more spatial locations to be analyzed, then operation returns to step S715. Otherwise, operation continues to step S745.

In step S745, a determination is made whether to modify or refine the data in the composite edge map. The inventor has determined that with or without modifying the composite edge map, the systems and methods of this invention usefully suppress artifacts in a wide variety of composite images. However, as discussed in detail further below, the composite edge map can also be refined by various operations to further suppress artifacts in the resulting composite image. Thus, both alternatives are within the scope of the systems and methods of this invention. The decision to modify or refine the composite edge map data may depend, for example, on the magnification and/or resolution of the source image relative to the features on the imaged object. These factors influence the level of detail visible in the source images, as well as the size of artifacts that may be present in out-of-focus image portions.

This decision may also or instead depend on, for example, whether the composite image processing time should be minimized. Depending on the particular structure of the composite image processing system and/or method according to this invention, this decision may be made manually, in a semi-automated fashion, or fully automatically. If the composite image processing time is not important in a particular application, then, as a default condition it may be decided to modify or refine the composite edge map. Alternatively, if an operator has previously observed similar composite images of similar objects, as may typically happen in a repetitive manufacturing or inspection environment, the operator may make the decision at least in part based on the operator's previous observations. If it is decided not to modify or refine the composite edge map, then operation jumps to step S770. Otherwise, if the composite edge map is to be modified or refined, operation continues to step S750.

In step S750 the composite edge map is refined. That is, the data associated with spatial locations corresponding to the composite image, and more particularly, the data associated with spatial locations in and around the spatial locations corresponding to valid edge results in the previously determined composite edge map, is modified through one or more operations to further suppress artifacts in the resulting composite image and/or to otherwise enhance the resulting composite image. A variety of well-known techniques used in known edge-detection methods, as well as any appropriate later-developed techniques, are usable according to various embodiments of the systems and methods according to this invention. For example, techniques based second-derivative operators may be used to "thin" edges in the composite edge map, thus removing some "blur" and other artifacts adjacent to edges. Additionally or alternatively, weak edges and fragments which are likely artifacts may be detected and eliminated by these methods. Such techniques are known to one skilled in the art of image processing. Machine Vision, by Jain, et al., discusses related teachings. After the data in the composite edge map is refined, operation continues to step S770.

In step S770, depending on the particular structure of the composite image processing system and/or method according to this invention, the data in the composite edge map, whether refined or not, is assembled, and then stored and/or output, as a representation usable to determine the edge pixels in the composite image. It should be appreciated that, regardless of the spatial resolution, that is, whether at pixel or meta-pixel resolution, this representation of the edge pixels in the composite image encompasses, and is generally spatially congruent with, the spatial locations included in the desired composite image. As shown in FIG. 5, operations corresponding to step S700 of FIG. 3 are complete at this point. In this case, operation continues to step S775, where operation continues to step S800.

Figure 6:
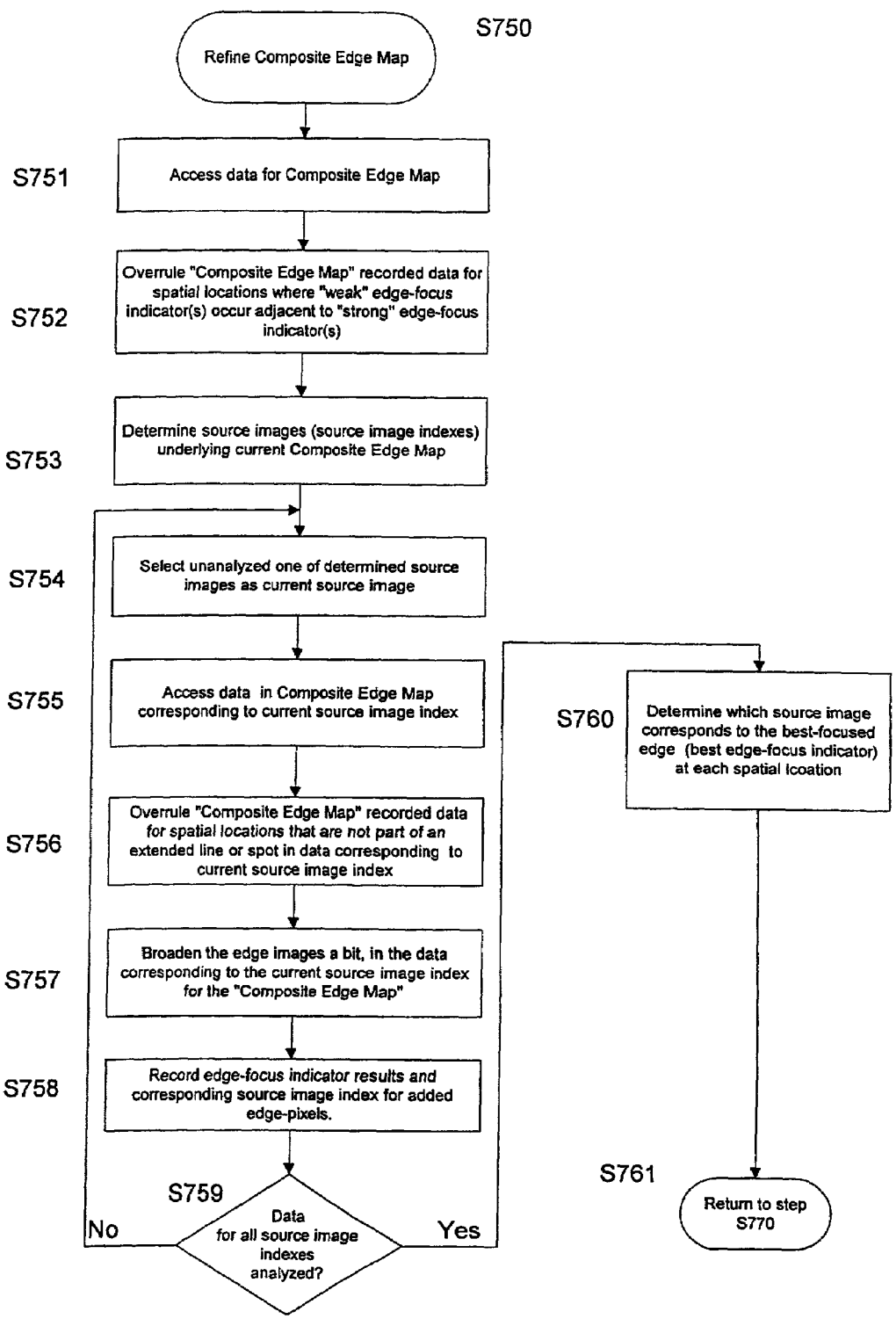
FIG. 6 is a flowchart outlining in greater detail one exemplary embodiment of the step of refining the composite edge map of FIG. 5 according to this invention.

FIG. 6 is a flowchart outlining in greater detail one exemplary embodiment of a set of operations usable for refining the composite edge map of step S750 of FIG. 5 according to this invention. Beginning in step S750, operation continues to step S751, where, depending on the particular structure of the composite image processing system and/or method according to this invention, it may be necessary to access or re-access the data previously referred to as the composite edge map, so that it may be modified and/or refined in subsequent steps. Operation then continues with step S752.

In step S752, the data referred to as the composite edge map is overruled and/or refined for spatial locations where "weak" edge-indicating data occurs within a prescribed distance of "strong" edge-indicating data. A strong edge, such as, for example, an edge which leads to a large numerical value in a gradient analysis, which is partially out of focus in a first one of the source images, may still be analyzed as an edge, although it is better-focused and more realistically imaged in a different one of the source images. When the strong edge is out of focus, the strong edge may be detected in a displaced or broaden location. This tends to produce artifacts if the strong edge is admitted to the composite image in an out-of-focus state. In step S752, at least some such artifacts not otherwise eliminated by the systems and methods of this invention are suppressed or eliminated.

In an exemplary embodiment, the edge-indicating data is in the form of the previously discussed gradient results combined into 5×5 meta-pixels. Each spatial location in the data referred to as the composite edge map is systematically analyzed to remove the edge-indicating data or to set it to zero at any spatial location where the original value of the edge-indicating data at that spatial location is less than the average of its 4-connected spatial neighbors.

Then, in step S753, the particular source images and/or focal planes represented in the current composite edge map are determined. In a first exemplary embodiment, each unique source image index represented in the data of the current composite edge map is recorded for governing subsequent iterative operations. In a second exemplary embodiment, the indexes of the entire plurality of source images are used for governing subsequent iterative operations. Next, in step S754, one of the source images determined in step S753 which has not been previously selected for analysis is selected as the current source image to be analyzed. In various exemplary embodiments, the current source image is identified by its corresponding source image index. Operation then continues to step S755.

In step S755, the data of the current composite edge map which corresponds to the current source image index is accessed or identified for evaluation. That is, all spatial locations in the current composite edge map which correspond to the current underlying source image are to be operated upon in the present iteration.

Next, in step S756, all spatial locations in the current composite edge map which correspond to the current underlying source image are analyzed to eliminate edge-pixels which are not part of an extended "line" or a spot. This further qualifies and cleans up the edges included in the data corresponding to the current composite edge map. In one exemplary embodiment, the analysis is done with reference to the previously described combined 5×5 meta-pixels, that is, with reference to "edge meta-pixels". Each spatial location corresponding to an edge meta-pixel is systematically analyzed. Each 5×5 edge meta-pixel is required to be part of a local group of four or more edge meta-pixels, where each meta-pixel of the local group must touch at least one other 4-connected neighbor in the local group. For spatial locations where isolated edge meta-pixels fail this criterion, the corresponding edge-indicating data and/or source image index is removed or set to zero. Operation then continues with step S757.

In an alternative exemplary embodiment, the previous embodiment is used except that each meta-pixel of the local group must touch at least one other 8-connected neighbor in the local group. In yet another alternative exemplary embodiment, each spatial location corresponding to an edge meta-pixel is systematically eroded with four structuring elements. Each structuring element is one meta-pixel wide and is four meta-pixels long in one of the horizontal, vertical and each diagonal direction, respectively. Following the erosion operation, each spatial location corresponding to an edge meta-pixel is systematically dilated with the same four structuring elements. This combination of operations is sometimes known as "opening" in the field of image processing. Such techniques are known to one skilled in the art of image processing. Machine Vision, by Ramesh Jain, et al., McGraw Hill, 1995 discusses related teachings. For the eliminated meta-pixels, the corresponding edge-indicating data and/or source image index is removed or set to zero in the data corresponding to the composite edge map.

The previous operations of steps S751-S756 have been directed toward further refining the data corresponding to the composite edge map, such that edge artifacts and noise corresponding to the current underlying source image are further suppressed. The composite edge map data remaining after step S756 of the current iteration is likely to corresponds to "true" edges that are reasonably well-focused in the current underlying source image.

In step S757, the set of spatial locations corresponding to the current underlying source image in the current composite edge map as modified in step S756, is spatially "expanded" to add adjacent edge pixels to the current composite edge map. Such added adjacent pixels will broaden the edge images a bit, and are selected in step S757 from the same source image as the adjacent well-focused edge. Thus, a good composite image should result. In one exemplary embodiment, the set of previously described binned 5×5 edge meta-pixels corresponding to the current underlying source image are systematically operated on with a 3×3 structuring element to perform a dilation.

Next, in step S758, for each spatial location where an added edge meta-pixel is obtained in step S757, the corresponding edge-indicating data and/or source image index is recorded in the data corresponding to the composite edge map.

Then, in step S759, a determination is made whether all of the data corresponding to all of the previously determined source images and/or source image indexes have been analyzed. If there is data remaining to be analyzed then operation returns to step S754, otherwise operation continues at step S760.

As a result of the previous operations of steps S751–S759, the data corresponding to all source images underlying the current composite edge map have been analyzed, refined and the refined results recorded. It should be appreciated that, as a result of these previous operations, it may occur that, for some spatial locations to be included in the composite image, more that one underlying source image is indicated to correspond to a valid well-focused edge. Thus, in step S760, for each spatial location having any corresponding edge-indicating data and/or source image index recorded in the data corresponding to the composite edge map, a determination is made regarding which underlying source image corresponds to the best edge image. For example, in various exemplary embodiments of step S760, this determination is made by identifying the maximum-valued edge-indicating data. Furthermore, in step S760, the corresponding best edge-indicating data and/or corresponding source image index is recorded in the data corresponding to the refined composite edge map as the basis for determining the composite image. Operation then continues to step S761, where the operation continues to step S770 of FIG. 5.

Figure 7:
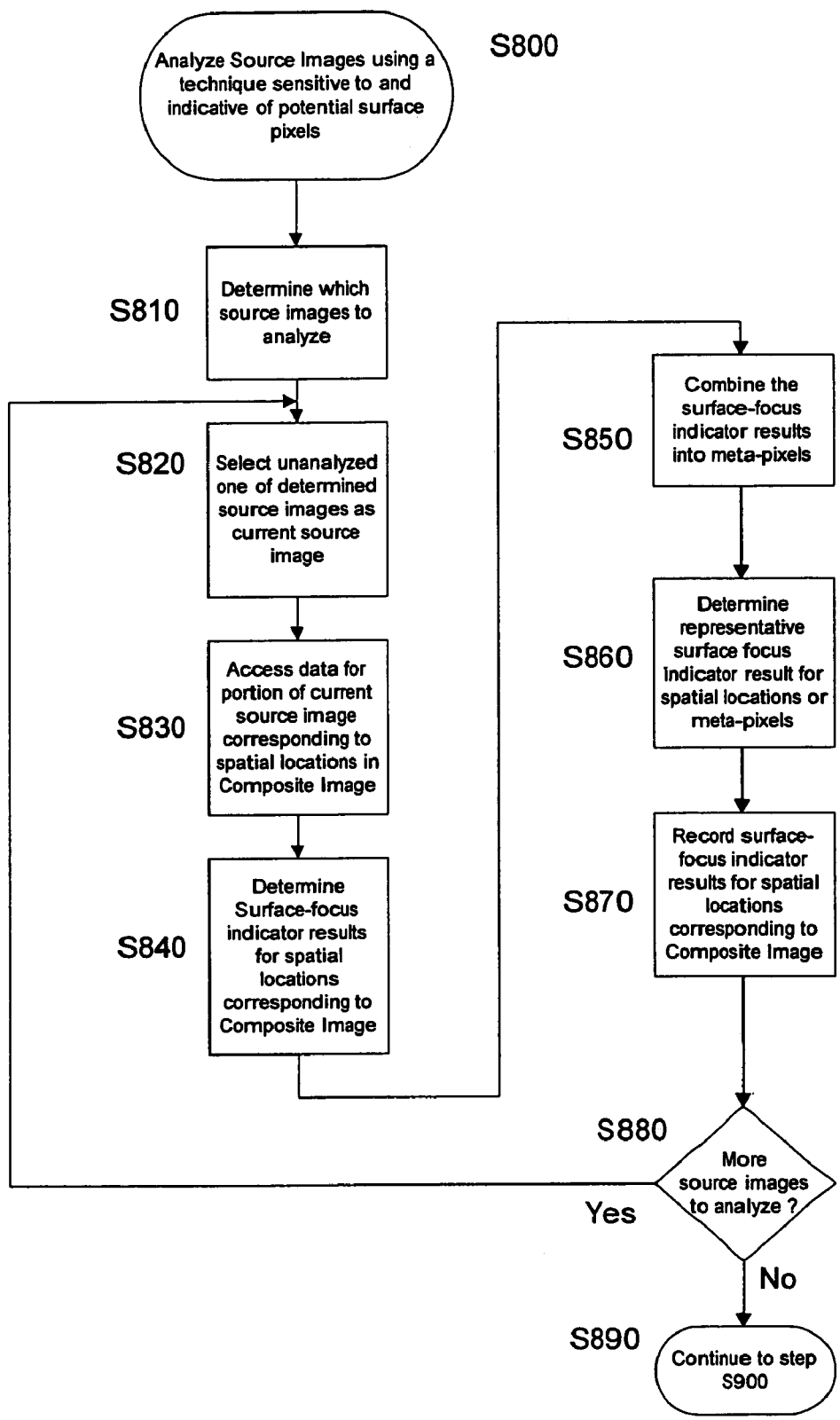
FIG. 7 is a flowchart outlining in greater detail one exemplary embodiment of the step of analyzing the source images using a technique sensitive to and indicative of potential surface pixels of FIG. 3 according to this invention.

FIG. 7 is a flowchart outlining in greater detail one exemplary embodiment of analyzing the source images using a technique sensitive to and indicative of potential surface pixels of step S800 of FIG. 3 according to this invention. Beginning in step S800, operation continues to step S810, where the source images to be analyzed are determined or defined in a manual, semi-automated, or automated fashion. For example, in the general case, one or more sets of source images have been previously acquired and stored. In such a case, step S800 may start after a long interruption of operations. Thus, it may be necessary to select and recall a particular set of source images. In another case, a set of source images may include images which include no focused features in the desired composite image region. Thus, in this case, it may be desirable to eliminate such source images from analysis to reduce processing time.

Next, in step S820, one of the source images determined in step S810 which has not been previously selected for analysis is selected as the current source image to be analyzed. Then, in step S830, the data is accessed for the current source image to be analyzed. More particularly, the data is accessed for the spatial locations within the current source image which correspond to the spatial locations included in the desired composite image. Operation then continues to step S840.

In step S840, the accessed source image data is analyzed to provide surface-focus indicator results and to provide a local result at a desired spatial resolution. In various exemplary embodiments, in step S840, the accessed source image data is analyzed using a mathematical or algorithmic technique which is sensitive to and indicative of local surface focus in the image. The local surface focus can be indicated, for example, by the spatial distribution of either grayscale intensities or color intensities, in a local neighborhood. Operation then continues to step S850.

In various exemplary embodiments of step S840, the data for the current source image is systematically operated upon such that, at each possible spatial location, an average image value, for example a gray level, is determined from the all the image values included in a 5×5 square of spatial locations centered on that spatial location. The resulting average local image value is subtracted from the image data value at that spatial location to create a residual value for each corresponding spatial location. For convenience, the resulting set of residual values and corresponding spatial locations is herein called a "residual image".

Next, in various exemplary embodiments, for each spatial location, the standard deviation of the residual values in a 5×5 region centered on that spatial location is determined. The standard deviation is divided by the mean of the residual values in that region to determine a surface-focus indicator result for that spatial location. For the surface-focus indicator results of the foregoing exemplary embodiments, a low value for the indicator corresponds to a smooth or unfocused surface region. In contrast, a high value for the indicator corresponds to an in-focus textured region. Many other techniques and metrics indicative of well-focused surface regions are known to one skilled in the art of image processing. Such techniques may be used as alternatives to the foregoing exemplary embodiments, to provide surface focus indicators usable according to the systems and methods of this invention. *Machine Vision*, by Ramesh Jain, et al., McGraw Hill, 1995 discusses related teachings.

In step S850, the surface-focus indicator results are combined into meta-pixels. Next, in step S860, a surface-focus indicator result representative of each meta-pixel is determined. The surface-focus indicator result can be determined, for example, by averaging all of the surface-focus indicator results encompassed by the meta-pixel. Typically, if meta-pixels are used with respect to one source image, then meta-pixels should be used with respect to each source image. It should be appreciated that, by matching the combined surface meta-pixel size to a previously used or prescribed edge meta-pixel size, and by further insuring that the combined surface meta-pixels and the combined edge meta-pixels spatially align in a one-to-one correspondence, computations and record keeping according to the systems and methods of this invention can be simplified. Operation then continues to step S870.

It should be appreciated that steps S850 and S860 are optional, depending on, for example, the magnification and resolution of the source images relative to the features on the imaged object, and/or whether it is desirable to minimize the composite image processing time. If the composite image processing time is not important in a particular application, then operation simply skips steps S850 and S860 and continues directly from step S840 to step S870.

It should be further appreciated that, in various exemplary embodiments, steps S840–S860 may be effectively combined and/or may be indistinguishable. For example, in an alternative exemplary embodiment, the residual image is determined as described above with regard to step S830. The residual image is then divided into a regular array of 5×5 regions. For each 5×5 region, the standard deviation of the residual values in that region is determined The determined standard deviation is divided by the mean of the residual values in that region to determine a surface-focus indicator result representative of that entire region and/or spatial location. In this alternative exemplary embodiment, it should be noted that the 5×5 region size is chosen to correspond to the 5×5 edge meta-pixel size discussed in association with the exemplary edge-pixel operations described above. In this alternative exemplary embodiment, steps S840 and S850 of determining a surface-focus indicator result at one spatial resolution and then combining the result at another spatial resolution, are effectively merged.

In step S870, the determined surface-focus indicator results are recorded or stored for subsequent use. It should be appreciated that, regardless of the spatial resolution, that is, whether at a pixel resolution or at a meta-pixel resolution, the surface-focus indicator results for the current source image encompass and are generally spatially congruent with, the spatial locations included in the desired composite image. Then, in step S880, a determination is made whether all the determined source images have been analyzed. If there are more source images to be analyzed, then operation returns to step S820. Otherwise, operation continues to step S890, where the operation continues to step S900.

Figure 8:
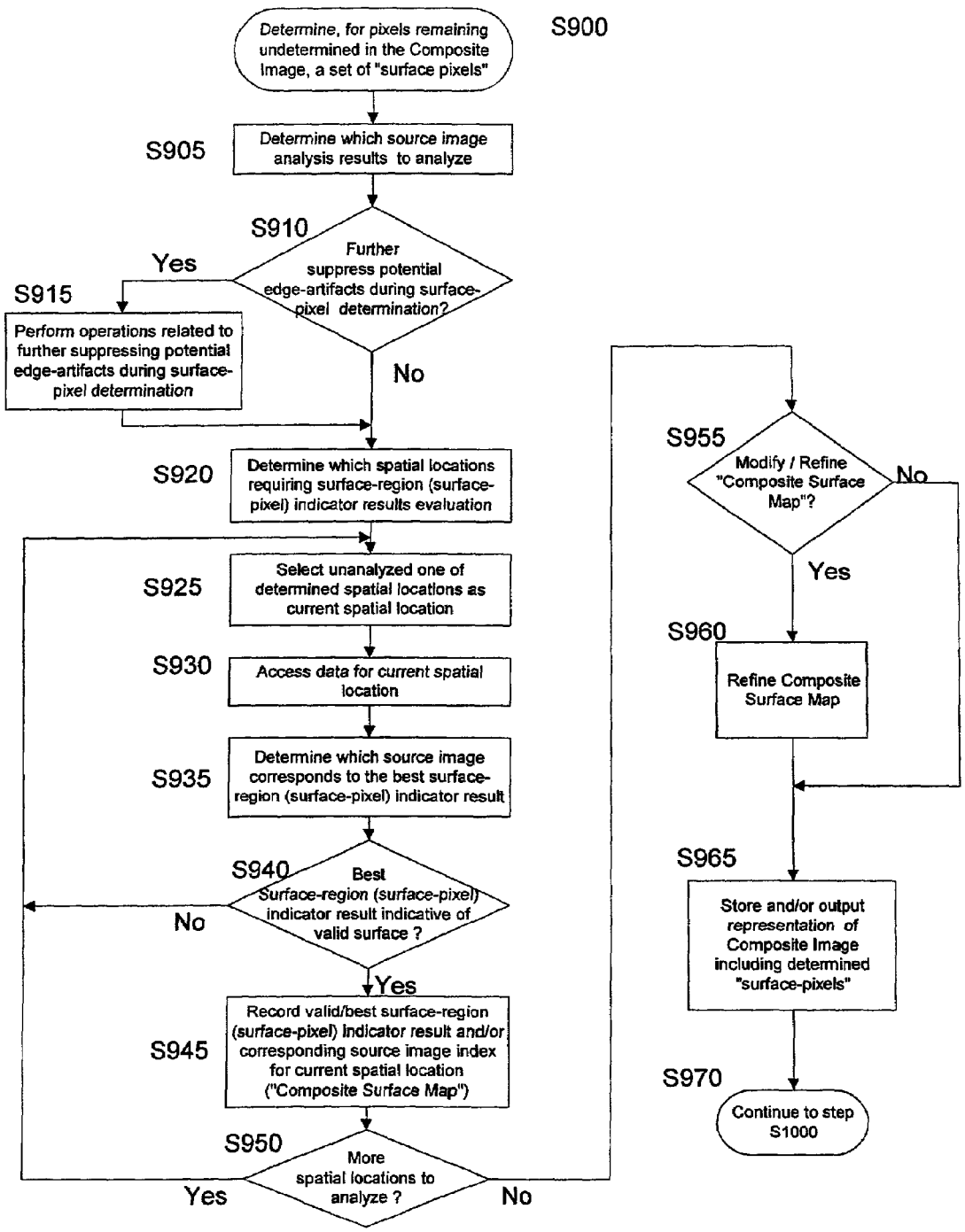
FIG. 8 is a flowchart outlining in greater detail one exemplary embodiment of the step of determining or selecting a set of surface pixels of FIG. 3 according to this invention.

FIG. 8 is a flowchart outlining in greater detail one exemplary embodiment of operations for determining or selecting a set of surface pixels in step S900 of FIG. 3 according to this invention As indicated above, in various exemplary embodiments, the determination or selection of the surface pixels is based on the results from an analysis technique which is sensitive to and indicative of potential surface pixels. Beginning in the step S900, operation continues to step S905, where the source image analysis results to be analyzed are determined. Depending on the particular structure of the composite image processing according to this invention, it may be necessary to establish or reestablish which source image analysis results are to be further analyzed. These source image analysis results to be further analyzed may be determined or defined manually, in a semi-automated fashion, or fully automatically. In various exemplary embodiments, the source image analysis results determined or defined in a previous step, such as step S800 of FIG. 3, represent the source image analysis results to be further analyzed. Operation then continues to step S910.

In step S910, a determination is made whether to perform additional operations to further suppress potential edge-artifacts in the composite image. The inventor has determined that, with or without such additional operations, the systems and methods of this invention usefully suppress artifacts in a wide variety of composite images. However, the operations discussed below with regard to step S915 can further suppress image artifacts which might otherwise appear in the composite image and which correspond to out-of-focus edges or boundaries included in the plurality of source images. Thus, both alternatives are within the scope of the systems and methods of this invention.

The decision to further suppress potential edge-artifacts in the composite image may depend on, for example, the magnification and/or resolution of the source image relative to the features on the imaged object. These factors influence the level of detail visible in the source images, as well as the size of artifacts that may be present in out-of-focus image portions. This decision may also or instead depend on, for example, whether the composite image processing time should be minimized. Depending on the particular structure of the composite image processing system and/or method according to this invention, the decision may be made manually, in a semi-automated fashion, or fully automatically.

If the composite image processing time is not important in a particular application, then, as a default condition, it may be decided to further suppress potential edge-artifacts in the composite image. Alternatively, if an operator has previously observed similar composite images of similar objects, as may typically happen in a repetitive manufacturing or inspection environment, the operator may make the decision at least in part based on the operator's previous observations. If it is decided not to further suppress potential edge-artifacts in the composite image, then operation jumps to step S920. If it is decided to further suppress potential edge-artifacts in the composite image, then operation continues with step S915.

In step S915, operations are performed to facilitate further suppressing potential edge-artifacts during subsequent surface-pixel determination operations. Then, in step S920, the spatial locations to be analyzed in the determined source image analysis results are determined.

In various exemplary embodiments of step S915, since strong edges can create artifacts in immediately adjacent regions of an image when such strong edges are out of focus, the data corresponding to the current composite edge map is analyzed to determine a set of spatial locations adjacent to the edges included in the current composite edge map. These spatial locations are treated as edge-artifact buffer zones during subsequent surface-pixel determination operations. In one exemplary embodiment, the data corresponding to the current composite edge map corresponds to the previously described 5×5 combined edge meta-pixels. Operations are performed which are essentially equivalent to dilating the spatial locations corresponding to the current composite edge map using a 5×5 structuring element, that is, 5×5 in terms of meta-pixels. Methods of dilating a set of spatial locations are known to one skilled in the art of image processing. Machine Vision, by Jain, et al., discusses related teachings.

For the added spatial locations corresponding to the results of the dilation operation, that is, excluding the previous elements already included in the composite edge map, special data and/or values are assigned and/or recorded. The special data and/or values identify these spatial locations as comprising edge-artifact buffer zones during further surface-pixel determining operations. Special rules are then applied to determine surface pixels in the edge-artifact buffer zone. For example, in an exemplary embodiment described in greater detail below, surface-pixel regions may "grow" into the edge-artifact buffer zone. However, a surface-pixel region is not allowed to start from a seed pixel in the edge-artifact buffer zone.

It should be appreciated that the previously described edge-artifact buffer zones may be alternatively described and determined as zones generally surrounding each edge included in the current composite edge map. In various exemplary embodiments, each zone has an outer zone-boundary, which is generally located at a prescribed setback distance from the edge pixels that the zone surrounds. The prescribed setback distance from the edge is generally prescribed in units of pixels, meta-pixels, or any set of units usable according to the systems and methods of this invention.

Depending on the particular structure of the composite image processing system and/or method according to this invention, it may be necessary to establish or reestablish in step S920 which spatial locations in the source image analysis results are to be further analyzed. In general, these spatial locations correspond to the spatial locations included in the desired composite image. These may be determined or defined manually, in a semi-automated fashion, or fully automatically. In general, these spatial locations correspond to the spatial locations included in the desired composite image.

In various exemplary embodiments, the source image analysis results determined or defined in a previous step, such as in step S800 of FIG. 3, represent the spatial locations to be further analyzed. If edge-artifact buffer zones have been determined as described below, then the spatial locations corresponding to those edge-artifact buffer zones are also included to be further analyzed. Furthermore, optionally, the spatial locations already determined corresponding to the composite edge map may be excluded from the spatial locations to be further analyzed.

In step S925, one of the spatial locations determined in step S920 which has not been previously selected for analysis is selected as the current spatial location to be analyzed. Next, in step S930, the source image analysis results data corresponding to each source image determined in step S905 are accessed for the current spatial location to be analyzed. Stated another way, all of the spatially congruent source image analysis results are accessed for all source images, for the current spatial location. Then, in step S935, the accessed data is analyzed to determine or select the best source image analysis result, to maximize the composite image focus results. For example, if the source image analysis results are numerical surface-focus indicator results, a most appropriate one of the plurality of numerical surface-focus indicator results is selected. In various exemplary embodiments, the most appropriate numerical surface-focus indicator result is the maximum result. Operation then continues to step S940.

In step S940, a determination is made whether the selected source image analysis result is indicative of a valid surface. For example, if the source image analysis result is a numerical surface-focus indicator result, this result is compared to a numerical threshold value, where only values exceeding the threshold value are taken to be indicative of a valid and adequately-focused surface for purposes of constructing the composite image. If the source image analysis result is not indicative of a valid surface, then operation returns to step S925. Otherwise, operation continues to step S945. Thus, in embodiments where the most appropriate numerical surface-focus indicator result in step S935 is the maximum result, then the result is a maximum result that also exceeds the threshold.

In step S945, the determined source image analysis result indicative of a valid surface, and/or an indication of the corresponding source image, such as an index number, is recorded or stored relative to the current spatial location. Then, in step S950, a determination is made whether all of the previously determined spatial locations to be analyzed have been analyzed. If there are more spatial locations to be analyzed, then operation returns to step S925. Otherwise, operation continues to step S955.

It should be appreciated that it is convenient to refer to the data elements and their respective associations recorded in step S945 as elements of a "composite surface map". However, it should be understood that whenever the term "map" is used herein, the term is being used only as a convenient reference for the underlying data elements and their respective associations, regardless of whether these recorded data elements are ever actually structured into a map in any conventional sense. It should be further understood that the scope of the systems and methods of this invention is in no way restricted to any particular representation of the basic underlying data and data associations disclosed herein.

In step S955, a determination is made whether to modify or refine the data in the composite surface map. The inventor has determined that, with or without modifying the composite surface map, the systems and methods of this invention usefully suppress artifacts in a wide variety of composite images. However, as discussed in detail further below, the composite surface map can also be refined by various operations to further suppress artifacts in the resulting composite image. Thus, both alternatives are within the scope of the systems and methods of this invention. The decision to modify or refine the composite surface map data may depend on, for example, the magnification and/or resolution of the source image relative to the features on the imaged object. These factors influence the level of detail visible in the source images, as well as the size of artifacts that may be present in out-of-focus image portions.

This decision may also or instead depend on, for example, whether the composite image processing time should be minimized. Depending on the particular structure of the composite image processing system and/or method according to this invention, this decision may be made manually, in a semi-automated fashion, or fully automatically. If the composite image processing time is not important in a particular application, then, as a default condition it may be decided to modify or refine the composite surface map. Alternatively, if an operator has previously observed similar composite images of similar objects, as may typically happen in a repetitive manufacturing or inspection environment, the operator may make the decision at least in part based on the operator's previous observations. If it is decided not to modify or refine the composite surface map, then operation jumps directly to step S965. Otherwise, if the composite surface map is to be modified or refined, operation continues to step S960.

In step S960, the composite surface map is refined. That is, the data associated with spatial locations corresponding to the composite image, and more particularly, the data associated with spatial locations in and around the spatial locations corresponding to valid surface results in the previously determined composite surface map, is modified through one or more operations to further suppress artifacts in the resulting composite image and/or to otherwise enhance the resulting composite image. Operation continues with step S965.

A variety of known image-enhancement techniques, as well as any appropriate later-developed techniques, are usable in step S960 according to various embodiments of the systems and methods according to this invention. For example, in various previously described exemplary embodiments, where a numerical surface-focus indicator result is compared to a numerical threshold value in step S940 to determine valid surface pixels, the data corresponding to the composite surface map may, in some cases, include voids surrounded by valid surface pixels. In this case, known void-filling techniques may be used to fill such voids. Such techniques are known to one skilled in the art of image processing. *Machine Vision*, by Jain, et al., discusses related teachings. However, because there are a plurality of source images which may potentially be used as the basis for the pixels values to be used to fill a void in the composite image, known methods for void filling must be supplemented with an additional method for selecting which source image, or source images, will provide the basis for filling a void.

In one exemplary embodiment of an additional method for selecting which source image, or source images, will provide the basis for filling a void, an erosion operation is followed by a dilation operation according to known techniques. Then, for each void which is filled according to these operations, the void is filled based on the source image index which is closest to the average of the source image indexes of the spatial locations which surround the void. In other exemplary embodiments, region-growing methods are used. Known region growing methods may be used, and such techniques are known to one skilled in the art of image processing. *Machine Vision*, by Jain, et al., discusses related teachings. However, similarly to known void-filling methods, known region growing methods must be also be supplemented with an additional method for selecting which source image, or source images, will provide the basis for the pixels which will be added to the growing region. An exemplary embodiment of region-growing operations usable for refinement of the composite surface map is described with reference to FIG. 9, further below.

In step S965, depending on the particular structure of the composite image processing system and/or method according to this invention, the data in the composite surface map, whether refined or not, is stored and/or output, as a representation usable to determine the surface pixels in the composite image. Operation continues to step S970, where operation continues to step S1000.

In various exemplary embodiments, the data corresponding to the composite surface map is combined with the data corresponding to the previously-determined composite edge map and/or composite image The combined surface and edge-pixel data is stored and/or output as a representation usable to determine the composite image. It should be appreciated that, regardless of the spatial resolution, that is, whether at pixel or meta-pixel resolution, this representation of the surface pixels and/or edge pixels in the composite image encompasses, and is generally spatially congruent with, the spatial locations included in the desired composite image each spatially congruent surface and/or edge pixel of the composite image may thus be determined at a pixel resolution from this representation.

For example, in various exemplary embodiments, surface-pixel and/or edge-pixel data is represented in the form of surface- and/or edge-meta-pixels, respectively, in the composite image representation. Each surface and/or edge pixel that is spatially congruent with a particular surface and/or edge meta-pixel, respectively, is given an image value based on the corresponding spatially congruent pixel in the source image corresponding to the source image index of that surface-meta-pixel.

Figure 9:
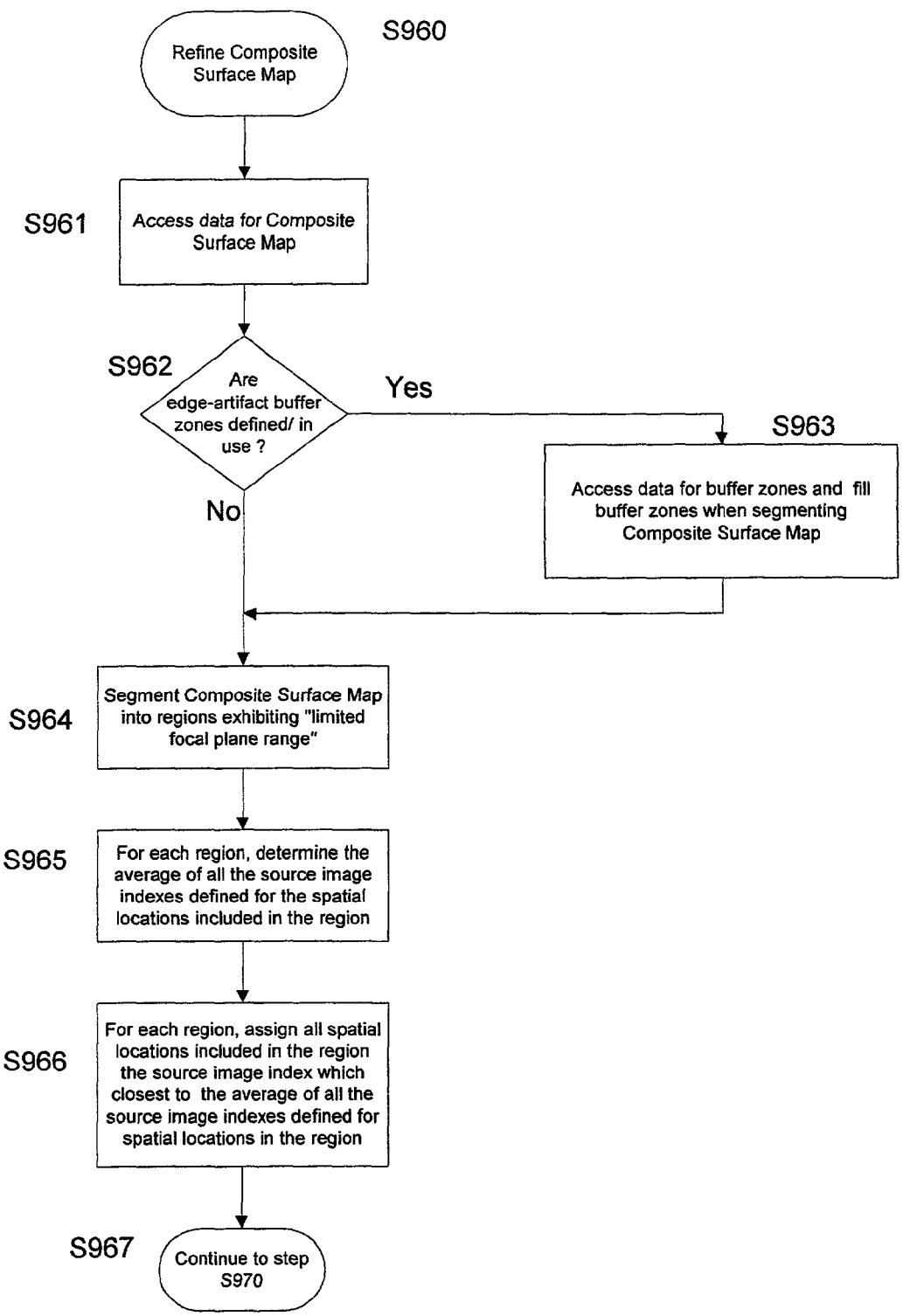
FIG. 9 is a flowchart outlining in greater detail one exemplary embodiment of the step of refining the composite surface map of FIG. 8 according to this invention.

FIG. 9 is a flowchart outlining in greater detail one exemplary embodiment of operations for performing the step of refining the composite surface map of step S960 of FIG. 8 according to this invention. Beginning in step S960, operation continues to step S961, where, depending on the particular structure of the composite image processing system and/or method according to this invention, it may be necessary to access/re-access the current data representation of the composite surface map, so that the current data representation of the composite surface map may be modified and/or refined in subsequent steps. Operation then continues with step S962.

In step S962, a determination is made whether operations have previously been performed to identify spatial locations comprising edge-artifact buffer zones, for example, as described above with respect to steps S910–S915 of FIG. 8. If it is determined that operations have not previously been performed to identify spatial locations comprising edge-artifact buffer zones, or if, in various exemplary embodiments, such previous operations are ignored, then operation jumps to step S964. Otherwise, if it is determined to use previously determined edge-artifact buffer zones in subsequent operations to further suppress potential edge-artifacts in the composite image, then operation continues with step S963.

In step S963, the current data representation of the edge-artifact buffer zones is accessed or re-accessed as necessary so that spatial locations included in the zones may be identified and filled according to special buffer zone filling operations in subsequent steps for determining/refining surface pixels in the composite image. Then, in step S964, the data corresponding to the current composite surface map is segmented into surface regions exhibiting limited focal plane range. That is, the current composite surface map is segmented into surface regions where the image data for all the spatial locations included in a surface region corresponds to a limited number of spatially adjacent source image focal planes. Operation then continues with step S965.

It should be appreciated that, in various exemplary embodiments, if operations corresponding to step S963 are performed, then the data corresponding to the edge-artifact buffer zones are included in the current composite surface map. It should be further appreciated that, in various exemplary embodiments, spatially adjacent source image focal planes are conveniently indicated by sequential source image indexes. In one exemplary embodiment, the data corresponding to the current composite surface map is in the form of the previously described 5×5 surface meta-pixels and generally includes a corresponding source image index which applies to each included pixel. In this exemplary embodiment, a recursive region-growing algorithm is applied to the data corresponding to the current composite surface map.

In one exemplary embodiment of this recursive region-growing technique, the current composite surface map data is systematically searched for the meta-pixel spatial location having the maximum surface-focus indicator value. For the reasons described below, the maximum surface-focus indicator value should also be greater that zero. Then, that meta-pixel spatial location is set as the primary seed for growing a surface region having a limited focal plane range. Next, the region is grown around the primary seed by including in the region all 4-connected neighbors of the primary seed which have a source image index which is within a range of plus or minus two increments of the source image index of the primary seed. Subsequently, each neighbor added to the region is taken as a secondary seed Each of the 4-connected neighbors of each secondary seed which have a source image index which is within a range of plus or minus two of the source image index of the primary seed are also included in the region. Each such added neighbor becomes an additional secondary seed. This is repeated until the region can grow no further.

In various exemplary embodiments, if the total region size so determined is less than a threshold size, such as, for example, three meta-pixels, then the elements of that region are assigned a surface-focus indicator value of zero, and are returned to the pool of unassigned elements. The step of requiring a minimum threshold size tends to suppresses small surface artifacts due to noise and/or minute out-of-focus surface particles, and the like. Otherwise, any spatial locations which have been associated with a region in any current or previous region-growing iteration are not considered in subsequent recursions.

When a region can grow no further, the recursive algorithm repeats for a new region, beginning with the search for the next spatial location having the maximum surface-focus indicator value. This next spatial location becomes a new primary seed for the new region. The recursive region-growing algorithm is repeated until all spatial locations included in the current composite surface map are included in the surface regions exhibiting limited focal plane range, or for a number of iterations predetermined to leave only a "visually insignificant" number of scattered pixels which are not associated with a surface region of limited focal plane range.

Throughout the recursive region growing algorithm, in various exemplary embodiments, the primary seeds are not generally selected corresponding to spatial locations in any edge-artifact buffer zone, so that out-of-focus edge artifacts can be further suppressed. In one exemplary embodiment, this is accomplished by assigning a special value of zero as the surface-focus indicator value for these edge-artifact buffer zone spatial locations, such that no such edge-artifact buffer zone spatial location will ever be a "maximum seed".

However, it should be appreciated that it is generally desirable that spatial locations in edge-artifact buffer zones, as well as spatial locations in the regions that failed to attain the minimum size threshold described above, should be allowed to join adjacent surface regions that grow to include them. This is done simply because such spatial locations are most likely to be best-focused at the same focal plane as the immediately adjacent surface region. Thus, throughout the recursive surface region-growing algorithm, whenever a region grows to include a neighbor that has a surface-focus indicator value of zero, that neighbor is included in the region, regardless of the source image index of the current primary seed.

It should be appreciated that, in the foregoing description of exemplary operations of the step S964, the range of source image indexes selected as the basis for admitting neighbors into a region will, in general, depend on the depth of focus of the plurality of source images relative to the focal plane step between adjacent source images. For example, in various respective exemplary embodiments, the nominal focal plane range allowed in a surface region may be set so that it does not extend beyond 1, 2, or 3 times the depth of field of the source image corresponding to the primary seed. In cases where the source image focal planes are relatively closely spaced, the number of source image indexes corresponding to the nominal focal plane range allowed in a region will be relatively greater. In contrast, in cases where the source image focal planes are relatively coarsely spaced, the number of source image indexes corresponding to the nominal focal plane range allowed in a region will be relatively fewer. It should also be appreciated that, in various alternative embodiments, 8-connected neighbors may be considered instead of the 4-connected neighbors used in the previously described surface region-growing operations.

It should be further appreciated that other surface region membership criteria may be added to overrule and/or supplement the simple source image index criteria described above, and that larger regions may thus result. For example, in a further exemplary embodiment, the distance of any particular neighbor from the primary seed is considered, and/or with the difference in the source image indexes between the neighbor and the primary seed, along with the associated surface-focus indicator values of the neighbor and the primary seed. The desired relationship between these various factors, which serves as the criteria for admitting a neighbor to a region, is determined by trial and error on a number of images representative of the expected application of the composite image system. In such an embodiment, slowly undulating or inclined surface portions which do not include a high degree of distinctive texture may be included in a region and a desirable composite image may still be obtained.

It should also be appreciated that, in various exemplary embodiments, spatial voids may remain in the data corresponding to the composite surface map resulting from the foregoing surface-pixel determining operations. Thus, in such exemplary embodiments, operations are performed to identify such voids and assign the source image index of the nearest neighbor to the spatial locations associated with each void. If there is more than one nearest neighbor, then the source image index of any nearest neighbor may be assigned to the void, according to any technique which is convenient in the processing operations used to determine the nearest neighbor.

In step S965, each of the surface regions determined in the operations of the previous step S964 are analyzed to determined the average source image index for each surface region. For each surface region, the average source image index for that region is the average of all the source image indexes of all the spatial locations included in that region.

Next, in step S966, for each of the surface regions analyzed in steps S964–S965, all of the spatial locations included in a region are assigned the source image index which is closest in value to the average source image index for that region. The average source image index corresponds to the source image having the focal plane which is taken to be most representative of all the respective focal planes corresponding to the respective spatial locations included in the region. Operation then continues to step S976, where operation continues to step S970.

It should be appreciated that when the surface pixels of the composite image are constructed based on the source image indexes assigned in step S966, each portion of the composite image corresponding to a particular surface region will thus be based on a single source image. In this way, the foregoing exemplary operations suppress or eliminate at least some out-of-focus artifacts not otherwise eliminated by the systems and methods of this invention.

As previously described, following execution of step S970 of FIG. 8, operation then continues to step S1000 of FIG. 3. In one exemplary embodiment of the operations corresponding to step S1000 of FIG. 3, a composite image representation resulting from the preceding steps of FIG. 9 may still contain voids. That is, a limited number of spatial locations may remain where the composite image pixels remain undetermined. For example, depending on the details of the particular surface pixel determining operations used, and especially in various exemplary embodiments which implement edge-artifact buffer zones, voids may be likely to occur at spatial locations near the edge-artifact buffer zones. In such a case, filling these and any other voids in the current composite image representation is preferably performed as part of step S1000.

In one exemplary embodiment of operations corresponding to step S1000, the source images and/or source image indexes corresponding to all determined pixels in the composite image are known according to methods previously described. To fill the voids, the spatial locations in the composite image representation corresponding to each unique source image and/or source image index included in the composite image representation are operated on in a separate iteration of the following operation: Initially, one of the unique source image indexes is chosen as the source image index for the current iteration. Then the spatial locations in the composite image representation corresponding to that index are dilated using a structuring element of a prescribed size, for example 3×3 pixels, according to known methods of dilation. For each spatial location "added" by the dilation operations of the current iteration, the current source image index is assigned as the basis for that spatial location in the composite image. However, it should be appreciated that, in this exemplary embodiment, a subsequent dilation operation never overrules the basis for a spatial location which has been previously determined in the composite image representation. Then these operations are repeated for a different source image index, until all source image indexes included in the composite image representation have been processed. If all voids are not filled after one pass through a set of iterations corresponding to all the source image indexes included in the representation of the composite image, the entire process is repeated.

In an alternative exemplary embodiment of the preceding operations, a subsequent dilation operation may overrule a source image index basis for a spatial location which was previously determined, but only for spatial locations which were voids filled by a previous dilation operation. In one exemplary embodiment, if a particular spatial location has been assigned two or more source image indexes after a particular pass through all the included source image indexes, then the source image index corresponding to the highest valued surface-focus indicator, or edge-focus indicator, respectively, is used as the basis for that spatial location. Furthermore, if all corresponding indicators are not of the same type, then the source image index corresponding to the best surface-focus indicator is used.

Returning now to a further discussion of operations corresponding to steps S600 and/or S700 of FIG. 3, in various exemplary embodiments of the systems and methods according to this invention, artifacts in the composite image are further suppressed and the composite image processing time is shortened when additional preliminary information is available regarding the portion of the object to be shown in the composite image. For example, information such as a CAD file representing an object, or a previous composite image of a substantially identical object, is frequently available in an industrial applications of machine vision systems.

In the case of a CAD file representation, it should be appreciated that the locations of edges and boundaries in the CAD file representation may be determined manually, in a semi-automated fashion, or fully automatically from a CAD representation, by a variety of known methods of CAD file feature extraction. In such a case, the spatial locations of the corresponding edges and boundaries in a current set of source images of a corresponding object may then be determined by a further variety of known manual, semi-automated, or automated methods of spatial congruence and/or feature congruence image processing. These methods may include, for example, coordinate matching, pattern matching, template matching, and the like. For example, such methods are routinely used for the inspection of the positions of edges and boundaries on objects in a variety of commercially-available machine vision systems, such as the Quick Vision series of vision inspection machines available from Mitutoyo America Corporation (MAC), located in Aurora, Ill.

When a desirable previous composite image according to the systems and methods of this invention is available, then the spatial locations of edge-pixels in that composite image are also available. Such a desirable previous composite image, of a substantially identical object, may be made spatially congruent with the current source images according to various well-known methods. These methods may include, for example, coordinate matching, pattern matching, template matching, image correlation, and the like. Thus, the corresponding spatial locations of edges in the current source images may be identified. In the case of such pre-existing CAD and/or desirable composite image representations, all operations described herein for determining edge-pixels in the composite image may be restricted to spatial locations in the vicinity of the determined edges in the pre-existing CAD or desirable composite image representations. Thus, artifacts and aberrations that might otherwise occur due to edge-analysis operations in other parts of the images are effectively suppressed. In addition, the related composite image processing considers fewer spatial locations and proceeds faster.

Figure 11:
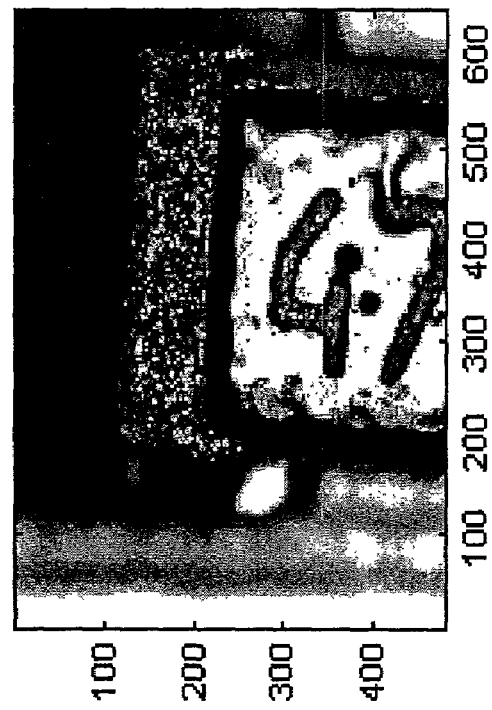
FIG. 11 is a second source image having a focal plane located at a second plane of an object.
Figure 10:
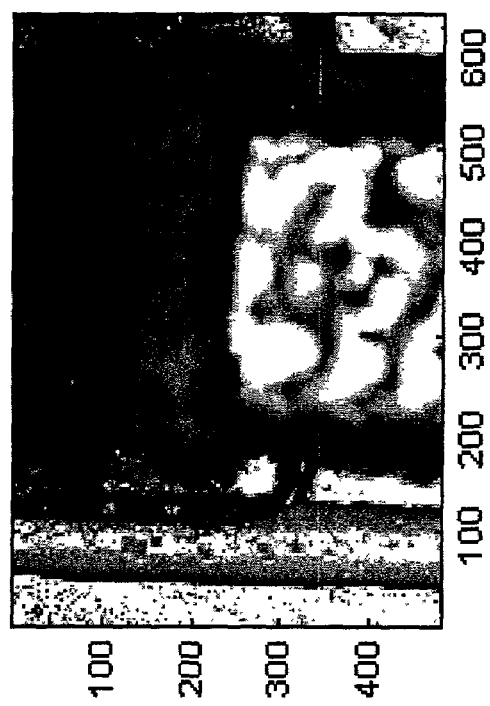
FIG. 10 is a first source image having a focal plane located at a first plane of an object.

Turning now to FIGS. 10–13, FIG. 10 is a first source image having a focal plane located at a first plane of an electronic assembly object, exemplifying the source images usable to construct a composite image according to the systems and methods of this invention. It should be noted that the source image shown in FIG. 10 is relatively well-focused at the right and left sides of the source image, but generally out-of-focus in the center portion. FIG. 11 is a second source image having a focal plane located at a second plane of the electronic assembly object, again exemplifying source images usable to construct the composite image according to the systems and methods of this invention. It should be noted that the source image shown in FIG. 11 is relatively well-focused at the central areas of the source image, but is generally out-of-focus at the left and right edge portions. The source images of FIGS. 10 and 11 were acquired using a commercially available vision system from the Quick Vision series of vision inspection machines available from Mitutoyo America Corporation (MAC), located in Aurora, Ill.

These two typical sources images are representatives from a plurality of eleven source images, wherein each pair of adjacent source images was separated by a 0.1 mm focal plane step. The gray scale information for the plurality of eleven source images was captured using a 2.5×magnification lens, the system camera, and operator-determined lighting settings. The source image shown in FIG. 10 corresponds to the assigned source image index of 5, while the source image shown in FIG. 11 corresponds to the assigned source image index of 10. Thus, these two images correspond to focal planes which are separated by 0.5 mm.

Figure 12:
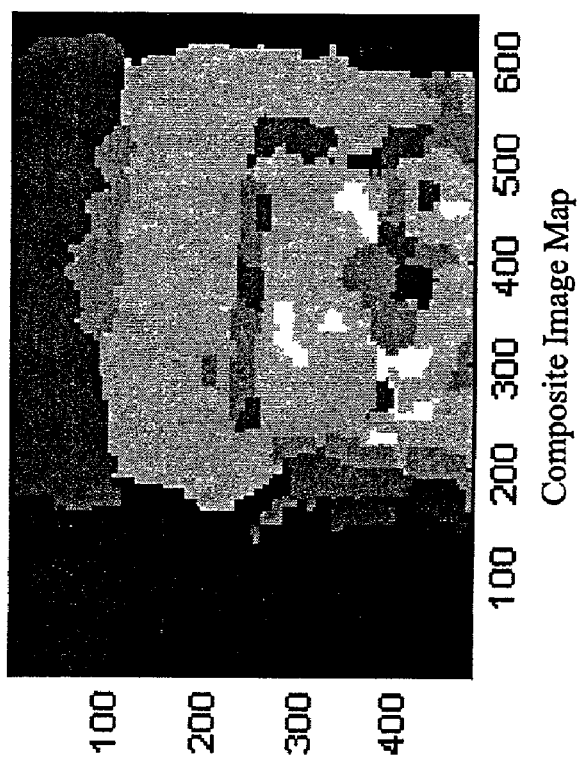
FIG. 12 is a composite image map based on a set of source images including the source images of FIGS. 9 and 10, determined according to this invention.

FIG. 12 is a representation of the composite image map determined based on the plurality of eleven source images, which were selected and analyzed according to the systems and methods of this invention. In FIG. 12, the data representation is shown in the literal form of a two-dimensional composite image map, for ease of visualization. Each shade of gray at a particular spatial location in FIG. 12 represents a different particular source image which is to be used as the basis for determining the composite image at that spatial location.

Figure 13:
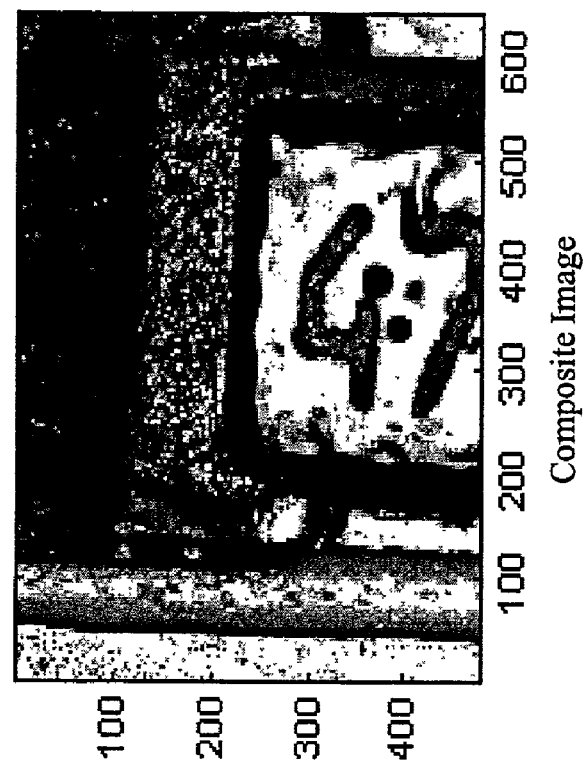
FIG. 13 is a composite image, based on the composite image map of FIG. 12 and a set of source images including the source images of FIGS. 9 and 10, determined according to this invention.

FIG. 13 is the composite image determined according to the composite image map represented in FIG. 12. It should be noted that the composite image shown in FIG. 13 is relatively well-focused throughout the entire composite image. At each spatial location in the composite image shown in FIG. 13, the composite image is determined by simply copying the image value at that spatial location from the particular source image which is indicated by the composite image map as the basis for determining the image value of the composite image at that spatial location. No additional image processing has been used to further enhance the composite image of FIG. 13. However, additional enhancements usable to improve the subjective quality of the composite image are also within the scope of the systems and methods according to this invention. Such enhancements, include, but are not limited to, various filters and smoothing techniques known to those skilled in the art of image processing. It should be appreciated that any appropriate known or later-developed image enhancement technique can be used to enhance the composite image.

It should be appreciated that, the control system portion 120 shown in FIG. 1 is, in various exemplary embodiments, implemented using a programmed general purpose computer. However, the control system portion 120 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the operations corresponding to the flowcharts shown in FIGS. 2–8, and as otherwise described herein, can be used to implement the control system portion 120. The particular form each of the circuits shown in the control system portion 120 of FIG. 1 will take is a design choice and will be obvious and predictable to those skilled in the art.

In FIG. 1, alterable portions of the memory 140 in various exemplary embodiments, whether volatile or non-volatile, can be implemented using any one or more of static or dynamic RAM, a floppy disk and disk drive, a writeable or rewriteable optical disk and disk drive, a hard drive, flash memory or the like. In FIG. 1, the generally static portions of the memory 140 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like. Thus, in FIG. 1, the memory 140 can be implemented using any appropriate combination of alterable, volatile or non-volatile memory or non-alterable, or fixed, memory.

Moreover, the control system portion 120 can be implemented as software executing on a programmed general purpose computer, a special purpose computer, a microprocessor or the like. In this case, the control system portion 120 can be implemented as a routine embedded in the vision system 100, as a resource residing on a server, or the like. The control system portion 120 can also be implemented by physically incorporating it into a software and/or hardware system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for constructing a composite image of at least a portion of an object based on a plurality of source images, each of the plurality of source images including at least that portion of the object, each of the plurality of source images corresponding to a different focal plane with respect to the object, the method comprising:

determining a first set of pixels of the composite image corresponding to at least one of edges and boundaries in the composite image, wherein the determining includes performing a first type of analysis of the plurality of source images at at least some of a plurality of spatial locations in the source images; and determining a second set of pixels of the composite image corresponding to surfaces in the composite image, wherein the determining includes performing a second type of analysis of the plurality of source images at at least some of the plurality of spatial locations in the source images, and at least one of determining the first set of pixels and determining the second set of pixels includes at least one operation that suppresses at least some pixels corresponding to at least partially out-of-focus edges or boundaries in the source images from being included in the composite image, wherein:

the first set of pixels of the composite image is determined before the second set of pixels of the composite image is determined;

the second set of pixels is determined at spatial locations outside of the spatial locations corresponding to the first set of pixels, and determining the second set of pixels of the composite image comprises:

selecting the respective pixels of the second set of pixels based at least partially on an analysis of focus at respective spatial locations in the plurality of source images; and selecting the respective pixels of the second set of pixels such that a corresponding map of the second set of pixels would include surface region segments of a predetermined minimum size where the source images corresponding to the respective pixels at all of the respective spatial locations included in a surface region segment provide at least one of a limited number of adjacent source image focal planes and a limited distance between the focal planes of the source images.

2. The method of claim 1, wherein the step of selecting the respective pixels of the second set of pixels based at least partially on an analysis of focus may indicate that no source image exhibits satisfactory focus within the at least one of a limited number of adjacent source image focal planes and a limited distance between the focal planes of the source images at certain spatial locations included in a respective surface region segment, and the step of selecting the respective pixels of the second set of pixels, such that a corresponding map of the second set of pixels would include surface region segments and selects respective filler pixels of the second set of pixels at those certain spatial locations such that the respective filler pixels correspond to the at least one of a limited number of adjacent source image focal planes and a limited distance between the focal planes of the source images associated with the respective surface region segment.

3. The method of claim 1, further comprising:

determining at least one pixel in the second set of pixels of the composite image that lies at least a prescribed setback distance away from each pixel of the first set of pixels of the composite image, the setback distance being a spatial distance, and subsequently determining at least one pixel in the second set of pixels of the composite image that lies at a distance less than the prescribed setback distance away from at least one pixel of the first set of pixels of the composite image, based at least partially on a characteristic associated with at-the at least one pixel in the second set of pixels of the composite image that lies at least the prescribed setback distance away from each pixel of the first set of pixels of the composite image.

4. The method of claim 3, wherein:

the at least one pixel in the second set of pixels of the composite image that lies at least the prescribed setback distance away from each pixel of the first set of pixels of the composite image comprises a seed pixel;

the subsequently determined at least one pixel in the second set of pixels that lies at a distance less than the prescribed setback distance away from at least one pixel of the first set of pixels of the composite image is determined based on a grown region including the seed pixel and having extents governed at least partially by the characteristic associated with the at least one pixel in the second set of pixels of the composite image that lies at least the prescribed setback distance away from each pixel of the first set of pixels, and the characteristic associated with the at least one pixel in the second set of pixels of the composite image that lies at least the prescribed setback distance away from each of the pixel of the first set of pixels comprises at least one of a source image identification, a source image index, and a source image focal plane location.

5. The method of claim 1, wherein at least one of the first type of analysis and the second type of analysis is based on at least one of grayscale image intensities and color image intensities.

6. The method of claim 1, wherein the first type of analysis comprises at least one of a gradient analysis, a gradient derivative analysis, spatial filtering, and Gaussian spatial filtering.

7. The method of claim 1, wherein determining the first set of pixels of the composite image comprises:

determining a preliminary first set of pixels at respective spatial locations such that the preliminary first set of pixels comprises respective source image edge pixels having a respective indicated degree of focus that is at least one of a satisfactory indicated degree of focus and a best indicated degree of focus available among the source images at the corresponding respective spatial location; and the at least one operation that suppresses at least some pixels corresponding to at least partially out-of-focus edges or boundaries comprises subsequently refining the preliminary first set of pixels by eliminating respective pixels that have a respective indicated degree of focus that is quantitatively poorer than a numerical criterion based on the indicated degree of focus of its connected neighbors in the preliminary first set.

8. The method of claim 1, wherein the second type of analysis comprises at least one of a texture classification analysis, a contrast classification analysis, a texture classification analysis including a variance analysis, and a fractal dimension analysis.

9. A computer readable recording medium that stores a control program, the control program executable on a computing device, the computing device couplable to a vision system, the control program including instructions for constructing an adequately focused composite image of at least a portion of an object based on a plurality of source images of at least that portion of the object, the plurality of source images corresponding to a plurality of focal planes with respect to the object, the instructions comprising:

instructions for determining a first set of pixels of the composite image corresponding to at least one of edges and boundaries in the composite image, wherein the determining includes performing a first type of analysis of the plurality of source images, images at at least some of a plurality of spatial locations in the source images, to determine a first set of pixels of the composite image corresponding to at least one of edges and boundaries in the composite image; and instructions for determining a second set of pixels of the composite image corresponding to surfaces in the composite image, wherein the determining includes performing a second type of analysis of the plurality of source images, images at at least some of the plurality of spatial locations in the source images, and at least one of determining the first set of pixels and determining the second set of pixels of the composite image includes at least one operation that suppresses at least some pixels corresponding to surfaces at least partially out-of-focus edges or boundaries in the source images from being included in the composite image, wherein:

the first set of pixels of the composite image is determined before the second set of pixels of the composite image is determined;

the second set of pixels is determined at spatial locations outside of the spatial locations corresponding to the first set of pixels, and determining the second set of pixels of the composite image comprises:

selecting the respective pixels of the second set of pixels based at least partially on an analysis of focus at respective spatial locations in the plurality of source images; and selecting the respective pixels of the second set of pixels such that a corresponding map of the second set of pixels would include surface region segments of a predetermined minimum size where the source images corresponding to the respective pixels at all of the respective spatial locations included in a surface region segment provide at least one of a limited number of adjacent source image focal planes and a limited distance between the focal planes of the source images.

10. A vision system comprising an imaging system, a vision system controller, a memory portion, and a composite image processor operable to construct an adequately focused composite image of at least a portion of an object based on a plurality of source images of at least that portion of the object, the plurality of source images corresponding to a plurality of focal planes with respect to the object, the composite image processor comprising:

an edge processing portion that performs a first type of analysis of the plurality of source images, at at least some of a plurality of spatial locations in the source images, to determine a first set of pixels of the composite image corresponding to at least one of edges and boundaries in the composite image; and a surface processing portion that performs a second type of analysis of the source images, at at least some of the plurality of spatial locations in the plurality of source images, to determine a second set of pixels of the composite image corresponding to surfaces in the composite image, wherein:

the edge processing portion determines the first set of pixels of the composite image before the surface processing portion determines the second set of pixels of the composite image; and the surface processing portion determines the second set of pixels at spatial locations outside of the spatial locations corresponding to the first set of pixels by:

selecting the respective pixels of the second set of pixels based at least partially on an analysis of focus at respective spatial locations in the plurality of source images; and selecting the respective pixels of the second set of pixels such that a corresponding map of the second set of pixels would include surface region segments of a predetermined minimum size where the source images corresponding to the respective pixels at all of the respective spatial locations included in a surface region segment provide at least one of a limited number of adjacent source image focal planes and a limited distance between the focal planes of the source images.

11. The vision system of claim 10, wherein:

the edge processing portion comprises:

a source image edge processing portion usable to provide a first characterization of the source images at the at least some of the plurality of spatial locations, the first characterization usable to indicate adequately focused edges or boundaries included in the source images, and a composite image edge determining portion that determines the first set of pixels of the composite image based on the first characterization provided by the source image edge processing portion; and the surface processing portion comprises:

a source image surface processing portion usable to provide a second characterization of the source images at the at least some of the plurality of spatial locations, the second characterization usable to indicate adequately focused surface regions included in the source images; and a composite image surface determining portion for determining the second set of pixels of the composite image based on the second characterization provided by the source image surface processing portion.

12. The vision system of claim 10, wherein;

the edge processing portion determines the first set of pixels of the composite image before the surface processing portion determines the second set of pixels of the composite image; and the surface processing portion determines the second set of pixels such that the second set of pixels does not include any of the pixels of the composite image which have been determined to be in the first set of pixels.

13. The vision system of claim 10, wherein the composite image processor is part of a general computerized control system of the vision system.

14. The vision system of claim 10, wherein the general computerized control system further comprising a control instruction generation system operable to generate at least one of a part program instruction, an inspection program control instruction, and a composite image processor control instruction, the generated instruction usable to operate the composite image processor to construct a desired representation of a composite image.

* * * * *